United States Patent
Kawakami et al.

(10) Patent No.: US 9,797,434 B2
(45) Date of Patent: Oct. 24, 2017

(54) BICYCLE SHIFT OPERATING DEVICE WITH A MULTI-DIRECTION OPERATING MEMBER

(75) Inventors: Tatsuya Kawakami, Sakai (JP); Etsuyoshi Watarai, Izumi (JP)

(73) Assignee: Shimano, Inc., Sakai, Osaka (JP)

( * ) Notice: Subject to any disclaimer, the term of this patent is extended or adjusted under 35 U.S.C. 154(b) by 1561 days.

(21) Appl. No.: 11/462,478

(22) Filed: Aug. 4, 2006

(65) Prior Publication Data
US 2007/0068316 A1    Mar. 29, 2007

Related U.S. Application Data

(63) Continuation-in-part of application No. 11/419,806, filed on May 23, 2006, now abandoned.

(30) Foreign Application Priority Data

Sep. 14, 2005    (JP) .................................. 2005-267225
Nov. 30, 2005   (JP) .................................. 2005-346206

(51) Int. Cl.
*F16C 1/22* (2006.01)
*F16C 1/12* (2006.01)
(Continued)

(52) U.S. Cl.
CPC ................ *F16C 1/22* (2013.01); *B62K 23/06* (2013.01); *B62M 25/04* (2013.01); *F16C 1/12* (2013.01);
(Continued)

(58) Field of Classification Search
CPC ........... F16C 1/10; B62M 25/00; B62M 25/04
(Continued)

(56) References Cited

U.S. PATENT DOCUMENTS 3,972,247 A    8/1976   Armstrong
4,899,610 A *  2/1990   Bourret ........................ 74/489
(Continued)

FOREIGN PATENT DOCUMENTS

DE    3136922 A1    3/1983
DE    10055403 A1   5/2002
(Continued)

OTHER PUBLICATIONS

European Search report for EP 0601055.8, a European application that is related to this application, dated Feb. 15, 2007.
(Continued)

*Primary Examiner* — Daniel D Yabut
(74) *Attorney, Agent, or Firm* — James A. Deland

(57) ABSTRACT

A shift operating device for a bicycle comprises a mounting member structured to be mounted to the bicycle, a cable coupling member coupled to the mounting member for moving a cable in a cable pulling direction and a cable releasing direction, a positioning unit that selectively maintains the cable coupling member in a plurality of operating positions, a first operating member that moves in a first direction and in a second direction different from the first direction, and a transmission unit that transmits movement of the first operating member to the positioning unit such that the cable coupling member moves from an origin operating position toward a destination operating position when the first operating member moves in either of both the first direction and the second direction.

41 Claims, 29 Drawing Sheets

(51) Int. Cl.
*B62K 23/06* (2006.01)
*B62M 25/04* (2006.01)

(52) U.S. Cl.
CPC ..... *F16C 2326/28* (2013.01); *Y10T 74/20438* (2015.01)

(58) Field of Classification Search
USPC ............. 74/488, 489, 500.5, 501.5 R, 501.6, 74/502.2, 473.14, 473.15
See application file for complete search history.

(56) References Cited

U.S. PATENT DOCUMENTS

| | | | |
|---|---|---|---|
| 5,012,692 A | 5/1991 | Nagano | |
| 5,044,213 A | 9/1991 | Nagano | |
| 5,203,213 A | 4/1993 | Nagano | |
| 5,241,878 A | 9/1993 | Nagano | |
| 5,257,683 A | 11/1993 | Romano | |
| 5,355,745 A * | 10/1994 | Wu et al. | 74/502.2 |
| 5,400,675 A | 3/1995 | Nagano | |
| 5,479,776 A | 1/1996 | Romano | |
| 5,660,083 A | 8/1997 | Huang | |
| 5,676,022 A | 10/1997 | Ose | |
| 5,730,030 A | 3/1998 | Masui | |
| 5,806,372 A | 9/1998 | Campagnolo | |
| 5,816,111 A * | 10/1998 | Borchers | 74/535 |
| 5,829,313 A | 11/1998 | Shahana | |
| 5,862,709 A | 1/1999 | Kageyama | |
| 5,921,138 A | 7/1999 | Kojima et al. | |
| 5,957,002 A | 9/1999 | Ueng | |
| 6,216,078 B1 * | 4/2001 | Jinbo et al. | 188/24.11 |
| 6,450,060 B1 | 9/2002 | Shahana | |
| 6,502,477 B1 * | 1/2003 | Assel | 74/502.2 |
| 6,725,740 B2 | 4/2004 | Dal Pra | |
| 6,862,948 B1 * | 3/2005 | Calendrille, Jr. | 74/502.2 |
| 6,868,752 B2 * | 3/2005 | Tetsuka et al. | 74/502.2 |
| 7,392,723 B2 * | 7/2008 | Tsumiyama | 74/502.2 |
| 7,526,979 B2 * | 5/2009 | Tsumiyama | 74/502.2 |
| 2002/0124679 A1 | 9/2002 | Dal Pra | |
| 2002/0139218 A1 * | 10/2002 | Tsumiyama et al. | 74/502.2 |
| 2003/0126940 A1 * | 7/2003 | Kawakami | 74/502.2 |
| 2004/0144193 A1 * | 7/2004 | Sato et al. | 74/502.2 |
| 2006/0207375 A1 * | 9/2006 | Jordan et al. | 74/489 |
| 2006/0272443 A1 * | 12/2006 | Tsumiyama | 74/502.2 |
| 2007/0017316 A1 * | 1/2007 | Tsumiyama | 74/502.2 |
| 2007/0068313 A1 * | 3/2007 | Tsumiyama | 74/502.2 |

FOREIGN PATENT DOCUMENTS

| | | |
|---|---|---|
| EP | 0671317 A1 | 9/1995 |
| EP | 0698548 A1 | 2/1996 |
| EP | 0785128 A2 | 7/1997 |
| EP | 0790173 A1 | 8/1997 |
| EP | 0790176 A1 | 8/1997 |
| EP | 1134158 A2 | 9/2001 |
| EP | 1232940 A2 | 8/2002 |
| EP | 1245483 A2 | 10/2002 |
| EP | 1327576 A2 | 7/2003 |
| EP | 1440878 A2 | 7/2004 |

OTHER PUBLICATIONS

European Search report for EP 06010557, the European application that corresponds to this application, dated Oct. 31, 2006. U.S. Pat. No. 5,676,022, cited in the search report, was also previously cited to the U.S. Patent Office on Aug. 4, 2006, at the time this application was filed.

* cited by examiner

BICYCLE SHIFT OPERATING DEVICE WITH A MULTI-DIRECTION OPERATING MEMBER

CROSS REFERENCE TO RELATED APPLICATIONS

This application is a continuation-in-part of copending application Ser. No. 11/419,806, filed May 23, 2006.

BACKGROUND OF THE INVENTION

The present invention is directed to bicycles and, more particularly, to a bicycle shift operating device with a multi-direction operating member.

Most bicycles include a transmission that allows the bicycle to be pedaled at a desired gear ratio. A shift control device mounted to the handlebars and connected to the transmission by a cable often controls the transmission by pulling and releasing the cable. The shift control device typically includes a winding member that pulls (winds) and releases (unwinds) the cable, a winding lever that causes the winding member to pull the control cable, and a release lever that causes the winding member to release the cable. Some shift control devices operate by moving the winding and release levers in the same direction (e.g., Japanese Patent No. 2730555), usually by pushing each lever using the thumb, whereas other shift control devices operate by moving the winding and release levers in opposite directions (e.g., Japanese Patent No. 3065656), usually by pushing the winding lever with the thumb and by pulling the release lever with the index finger. However, some riders may prefer to operate a particular lever in a direction opposite the conventionally designed direction in order to either pull or release the cable.

Some shift control devices have the further ability to pull or release the cable to shift through multiple gear ratios for a single operation of the winding and/or release lever. An example of a shift control device that releases the cable to shift through multiple gear ratios for a single operation of a release lever is shown in Japanese Published Patent Application No. 2004-231176. That shift control device is mounted together with a brake lever assembly for a road racing bicycle. More specifically, a brake lever pivots around a brake lever pivot shaft, and a shift control unit pivot shaft is provided for rotatably supporting elements of the shift control device. The shift control unit pivot shaft is oriented differently from the brake lever pivot shaft. A cable coupling member is rotatably supported by the shift control unit pivot shaft for moving a shift control cable in a cable pulling direction and a cable releasing direction, and a positioning unit selectively maintains the cable coupling member in a plurality of operating positions. The positioning unit includes a toothed member that rotates integrally with the cable coupling member, and a positioning pawl selectively engages the toothed member to maintain the cable coupling member in the plurality of operating positions. A release lever rotates a release wheel having a plurality of release teeth such that multiple release teeth sequentially contact the positioning pawl for a single operation of the release lever. This causes the positioning pawl to oscillate and thereby allow the cable coupling member to move in the cable releasing direction through a plurality of operating positions.

SUMMARY OF THE INVENTION

The present invention is directed to various features of a bicycle shift control device. In one embodiment, a shift operating device for a bicycle comprises a mounting member structured to be mounted to the bicycle, a cable coupling member coupled to the mounting member for moving a cable in a cable pulling direction and a cable releasing direction, a positioning unit that selectively maintains the cable coupling member in a plurality of operating positions, a first operating member that moves in a first direction and in a second direction different from the first direction, and a transmission unit that transmits movement of the first operating member to the positioning unit such that the cable coupling member moves from an origin operating position toward a destination operating position when the first operating member moves in either of both the first direction and the second direction.

In another embodiment, a shift operating device for a bicycle comprises a mounting member structured to be mounted to the bicycle, a cable coupling member coupled to the mounting member for moving a cable in a cable pulling direction and a cable releasing direction, and a positioning unit that selectively maintains the cable coupling member in a plurality of operating positions. The positioning unit comprises a positioning member that moves with the cable coupling member and has a plurality of teeth, and a positioning pawl that moves between a tooth engaged position, for engaging selective ones of the plurality of teeth, and a tooth disengaged position. A release element moves linearly and has a plurality of release members that progressively cause the positioning pawl to move from the tooth engaged position to the tooth disengaged position multiple times for a single movement of the release element.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
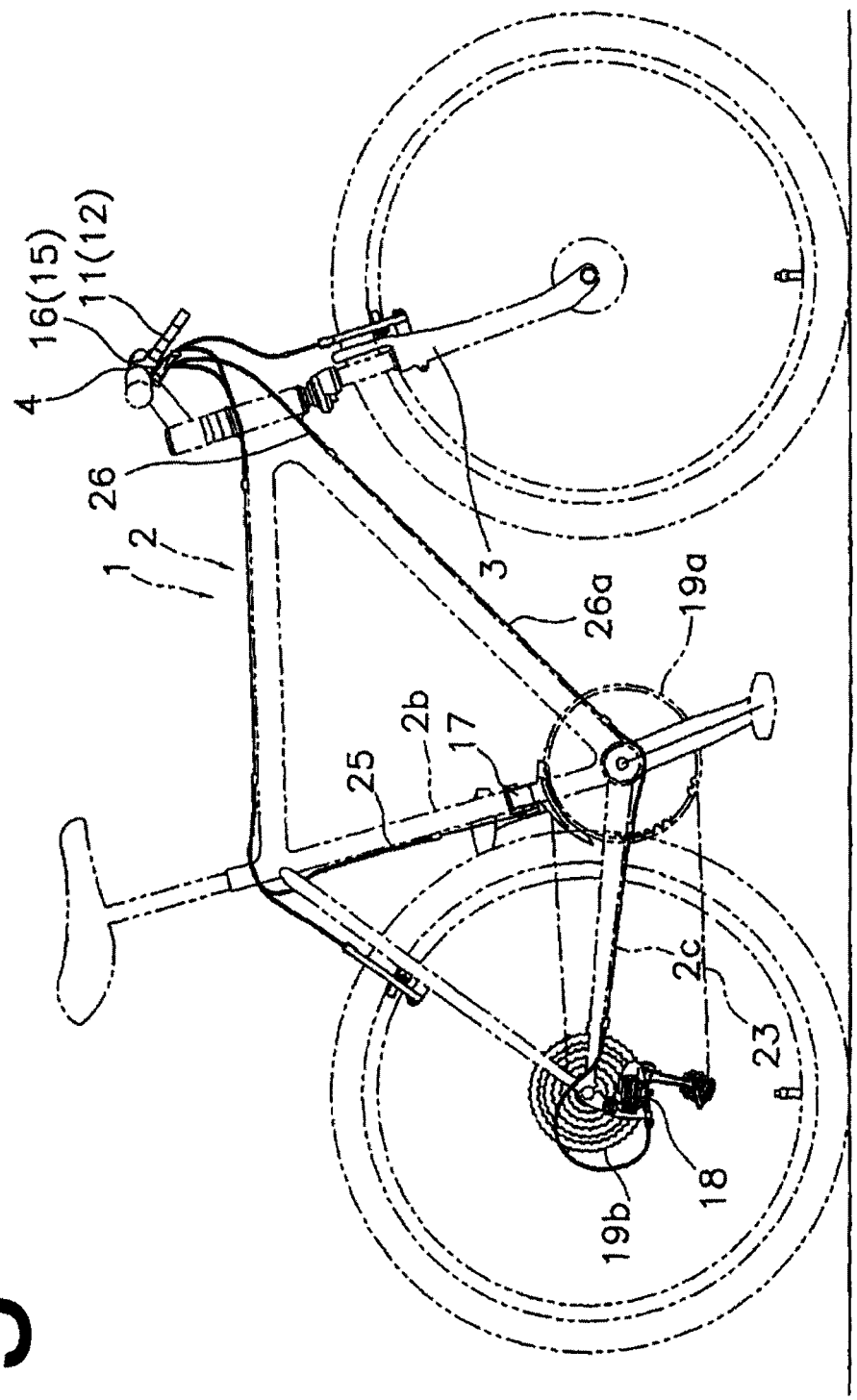
FIG. 1 is a side view of a particular embodiment of a bicycle.

FIG. 1 is a side view of a bicycle 1 that includes particular embodiments of transmission shift control devices. Bicycle 1 is a sport bicycle of a mountain bike type, and it comprises a frame 2, a front suspension fork 3 rotatably mounted to frame 2, a handlebar assembly 4 mounted to the upper part of fork 3, a front derailleur 17 mounted to a middle portion of frame 2, and a rear derailleur 18 is mounted to a rear end of frame 2. Front derailleur 17 is placed, for example, at a lower portion of a seat tube 2b of frame 2 for guiding a chain 23 among a plurality of (e.g., three) front sprockets 19a. Rear derailleur 18 is placed at the rear of a chain stay 2c of frame 2 for guiding chain 23 among a plurality of (e.g., nine) rear sprockets 19b. Front derailleur 17 is connected to a front shift control device 15 through a front shift control cable 25, and rear derailleur 18 is connected to a rear shift control device 16 through a rear shift control cable 26 that includes an inner cable 26a. Front and rear shift control devices 15 and 16 are mounted at opposite ends of handlebar 4 laterally inwardly from front and rear brake levers 12 and 11, respectively, and they are constructed symmetrically while accommodating different numbers of sprockets. Thus, only the structure and operation of rear shift control device 16 will be described in detail.

Figure 2:
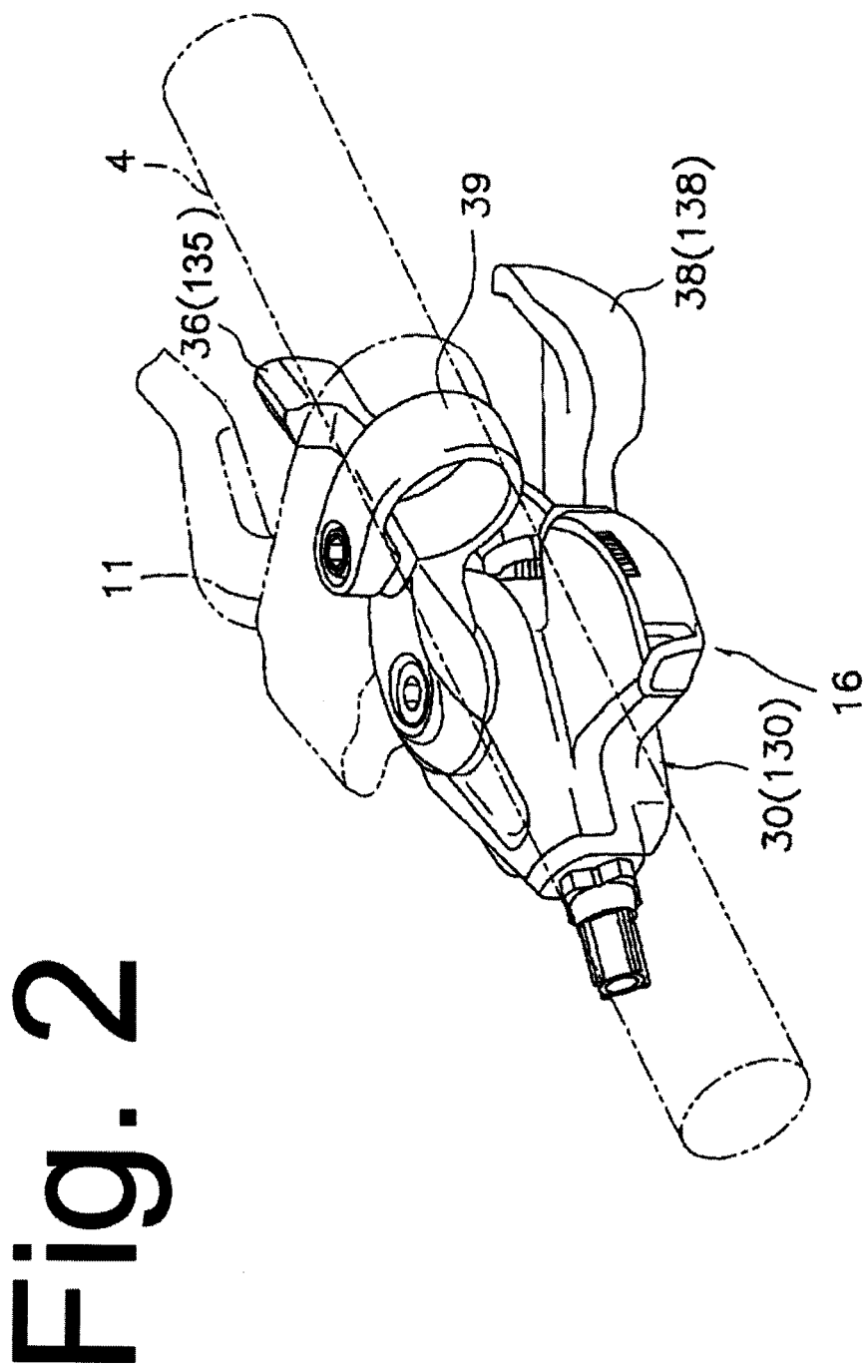
FIG. 2 is an oblique view of a particular embodiment of a shift control device mounted to the handlebar.
Figure 3:
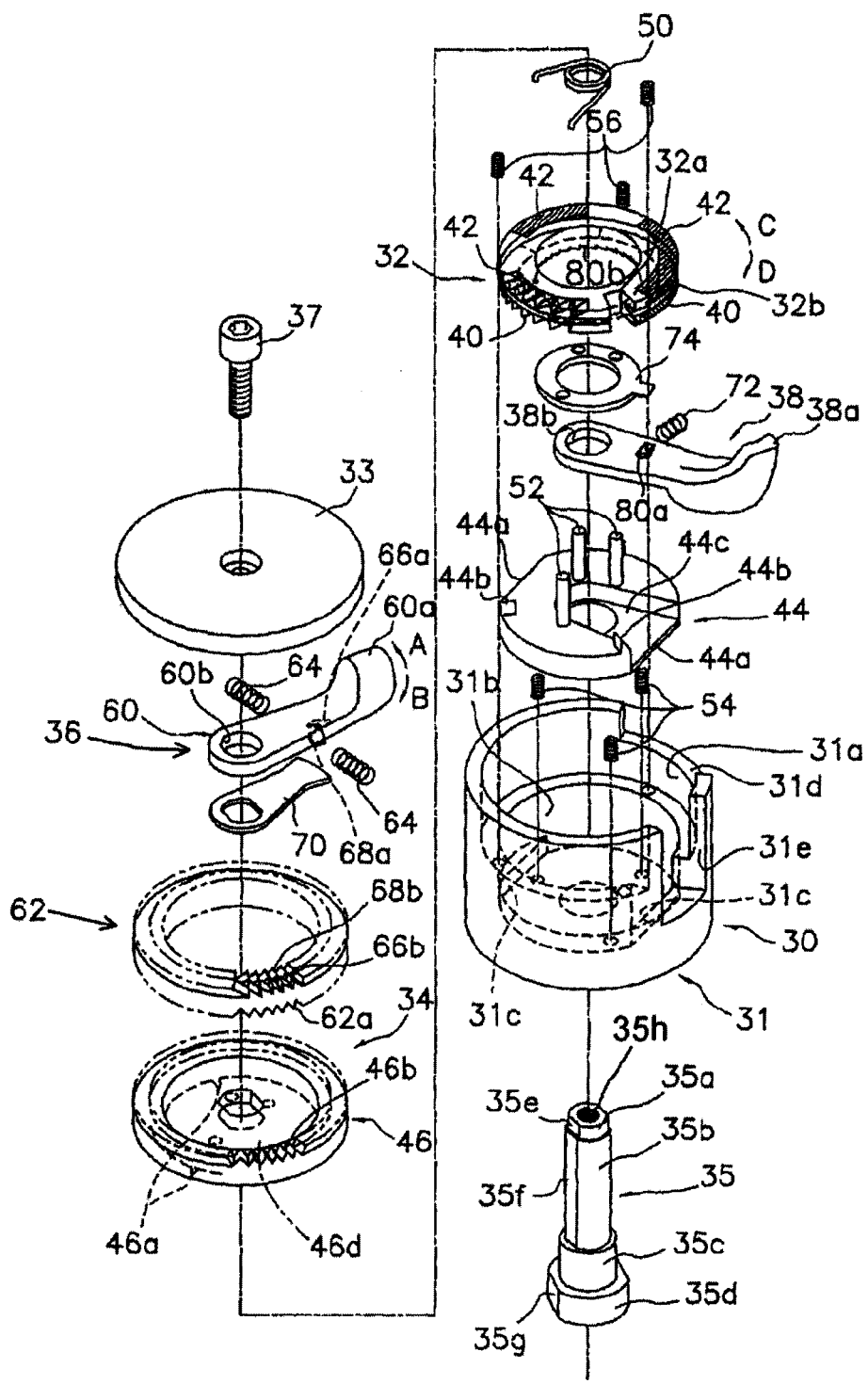
FIG. 3 is an exploded view of a first embodiment of a shift control device.

As shown in FIG. 2, rear shift control device 16 comprises a mounting member 30 structured to be mounted to handlebar 4 through a mounting band 39. If desired, mounting member 30 may be integrally secured to a mounting bracket for rear brake lever 12. As shown in FIG. 3, rear shift control device 16 further comprises a support shaft 35 that mounts to a closed-end cylindrical body portion 31 of mounting member 30, a cable coupling member in the form of a winding member 32 rotatably mounted to support shaft 35 for rotating in a cable pulling direction (indicated by arrow C) and a cable releasing direction (indicated by arrow D) of inner cable 26a, a positioning member 44 disposed between winding member 32 and the bottom of body portion 31 for selectively holding winding member 32 in any one of a plurality of operating positions corresponding to a plurality of shift positions of rear derailleur 18, a first operating member in the form of a release lever 36 for a cable releasing operation, a second operating member in the form of a winding lever 38 for a cable winding operation, an intermediate member 62, a release element 46 disposed between intermediate member 62 and winding member 32, a disc-shaped cover member 33, and a screw 37 that screws into a threaded opening 35h in a top portion of support shaft 35 for fastening cover member 33 to the top of body portion 31 and retaining all of the noted components within body portion 31. As used herein, the term "shift position" refers to the ordinary meaning of the normal steady-state running position of the bicycle transmission that produces a desired gear ratio. For a derailleur, that means the position of the derailleur that engages the chain with one of the sprockets to produce the desired gear ratio.

Body portion 31 defines two coaxial cylindrical large and small accommodation spaces 31a and 31b therein, wherein a pair of parallel rotation inhibiting flats 31c are formed at the bottom of small accommodation space 31b. Body portion 31 also includes notches 31d and 31e, wherein notch 31d receives release lever 36 therethrough and limits its range of motion, and notch 31e receives winding lever 38 therethrough and limits its range of motion.

Support shaft 35 is a stepped shaft having a small diameter portion 35a at the top, a middle diameter portion 35b, and a large diameter portion 35c at the bottom. A flange 35d is formed at the end of large diameter portion 35c. Parallel rotation inhibiting flats 35e, 35f and 35g are formed in small diameter portion 35a, middle diameter portion 35b and flange 35d, respectively. Rotation inhibiting flats 35g engage the bottom of body portion 31 to nonrotatably fix support shaft 35 relative to body portion 31.

Positioning member 44 is mounted in small accommodation space 31b of body portion 31. Positioning member 44 comprises a disk-shaped member having parallel rotation inhibiting flats 44a that engage rotation inhibiting flats 31c in body portion 31 to nonrotatably mount positioning member 44 relative to body portion 31. Three rod-shaped contact members 52 and three serrated positioning pawls 44b extend upwardly from the upper surface of positioning member 44. Positioning pawls 44b are placed at three evenly-spaced circumferential positions at the outer peripheral edge of positioning member 44. Three coil springs 54 are mounted between a bottom surface of positioning member 44 and a bottom surface of body portion 31 to bias positioning member 44 upwardly. A lever accommodating recess 44c is formed at the upper surface of positioning member 44 for receiving winding lever 38 therein and limiting its range of motion.

Winding member 32 comprises a ring-shaped metal member rotatably mounted around support shaft 35 within small accommodation space 31b above rotation inhibiting flats 31c. Winding member 32 includes, at an outer peripheral surface thereof, a cable coupling portion 32a that locks a cable nipple (not shown) secured to a tip of inner cable 26a, and a cable winding groove 32b for winding inner cable 26a. Winding member 32 is biased in the cable releasing direction by a biasing member in the form of a torsion coil spring 50. Spring 50 has one end fixed to winding member 32 and another end fixed to positioning member 44. A first winding member ratchet unit 40 is formed at an outer peripheral portion of a lower surface of winding member 32, a second winding member ratchet unit 80b is formed at an inner peripheral portion of a lower surface of winding member 32, and a third winding member ratchet unit 42 is formed at an upper surface of winding member 32. If desired, first and third winding member ratchet units 40 and 42 may be formed in three circumferential groups corresponding to the shaded portions indicated in FIG. 3. Second winding member ratchet unit 80b is formed over the entire inner peripheral portion of the lower surface of winding member 32.

Figure 4:
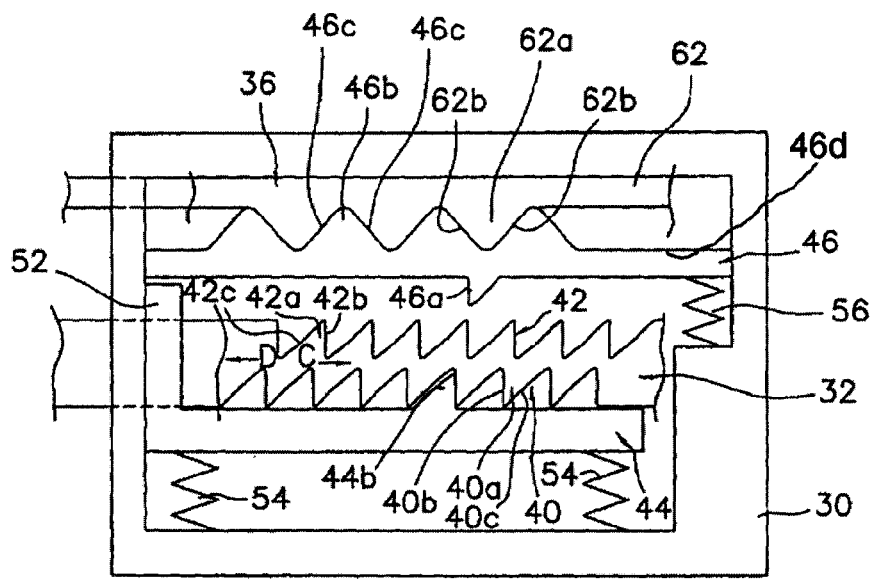
FIGS. 4-8 are schematic views of a cable releasing operation.

As schematically shown in FIG. 4, first and third winding member ratchet units 40 and 42 comprise a plurality of serrated ratchet teeth 40a and 42a. The numbers of ratchet teeth 40a and 42a are determined by the number of operating positions of winding member 32 (shift steps), and they are spaced accordingly. Each ratchet tooth 40a has a vertical surface 40b that faces to the left for contacting a right-facing vertical surface of a corresponding positioning pawl 44b of positioning member 44 for preventing rotation of winding member 32 in the cable releasing direction. Each ratchet tooth 40a also has an inclined surface 40c on its right side. First winding member ratchet unit 40 and positioning pawls 44b on positioning member 44 form a positioning unit that selectively maintains winding member 32 in selected ones of the plurality of operating positions. Each ratchet tooth 42a has a vertical surface 42b on its right side and an inclined surface 42c on its left side.

Release element 46 is a disk-shaped member nonrotatably mounted to rotation inhibiting flats 35f of support shaft 35 above winding member 32 in large accommodation space 31a of body portion 31 in a manner that allows vertical movement along support shaft 35. A bottom surface 46d of release element 46 engages contact members 52 on positioning member 44 so that both positioning member 44 and release element 46 are biased upwardly by springs 54 located below positioning member 44. Furthermore, biasing members in the form of coil springs 56 are disposed between bottom surface 46d of release element 46 and a stepped surface formed by body portion 31 at the transition between large accommodation space 31a and small accommodation space 31b to bias release element 46 upwardly. In operation, discussed below, release element 46 moves downward to release the engagement between first winding member ratchet unit 40 and positioning pawls 44b on positioning member 44.

Three serrated tooth engaging pawls 46a extend downwardly from the bottom surface 46d of release element 46, and a plurality of release member cam teeth 46b extend upwardly along an entire outer peripheral upper surface of release element 46. As shown in FIG. 4, each tooth engaging pawl 46a has a left-facing vertical surface adapted to contact a corresponding vertical surface 42b of a ratchet tooth 42a, and a height of tooth engaging pawl 46a is slightly less than the height of its corresponding ratchet tooth 42a. Each release member cam tooth 46b has a pair of side surfaces 46c that form the shape of a triangle.

Figure 10:
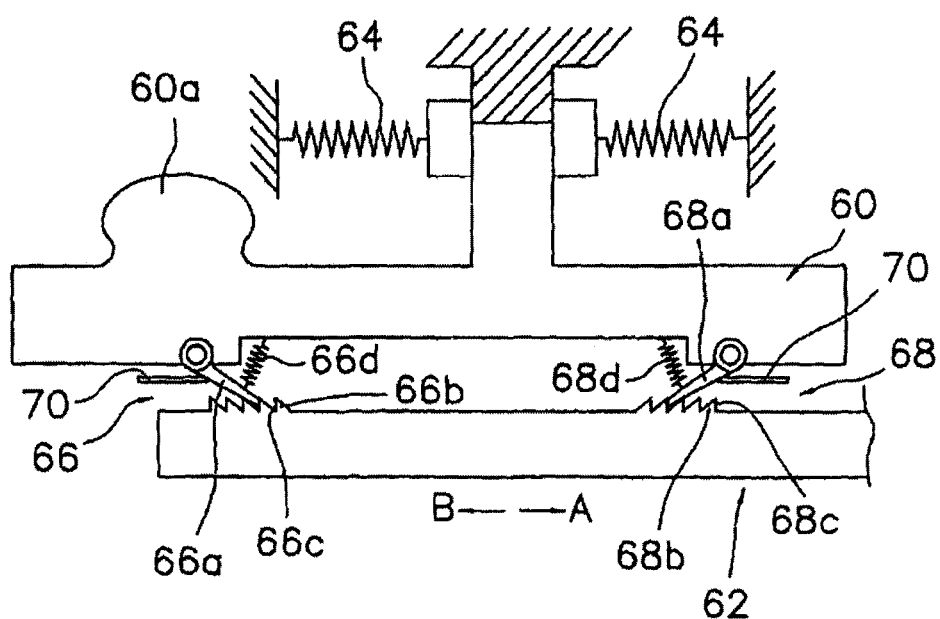
FIG. 10 is a schematic view of a pair of one-way clutches associated with a release lever.

Intermediate member 62 is a ring-shaped member, and it is disposed between release element 46 and cover member 33. A plurality of intermediate member cam teeth 62a extend downwardly along an entire outer peripheral lower surface of intermediate member 62 for contacting release member cam teeth 46b, a plurality of serrated first intermediate member ratchet teeth 66b extend upwardly along an entire outer peripheral upper surface of intermediate member 62, and a plurality of serrated second intermediate member ratchet teeth 68b extend upwardly along an entire inner peripheral upper surface of intermediate member 62. As shown in FIG. 4, each intermediate member cam tooth 62a has a pair of side surfaces 62b that form the shape of a triangle. The engagement between intermediate member cam teeth 62a and release member cam teeth 46b allows intermediate member 62 to move release element 46 toward and away from intermediate member 62 when intermediate member 62 moves in either a clockwise or a counterclockwise direction. As shown in FIGS. 3 and 10, each first intermediate member ratchet tooth 66b has a clockwise-facing vertical surface 66c, and each second intermediate member ratchet tooth 68b has a clockwise-facing vertical surface 68c.

Release lever 36 includes a release lever body 60 with a mounting opening 60b mounted around support shaft 35 at the stepped surface between small diameter portion 35a and middle diameter portion 35b for rotation in a first direction (indicated by a counterclockwise arrow A in FIG. 3) and a second direction (indicated by a clockwise arrow B in FIG. 3). Release lever body 60 is biased to a start or neutral position by a pair of biasing members in the form of coil springs 64 placed on opposite sides thereof. A positioning member (not shown) for positioning release lever body 60 in the neutral position is placed between release lever body 60 and small diameter portion 35a of support shaft 35. The positioning member may comprise, for example, a spring-biased radially-movable positioning pin mounted to small diameter portion 35a for engaging a positioning recess (detent) formed in an inner peripheral surface of mounting opening 60b. Release lever body 60 extends radially outwardly from body portion 31 and includes an operating tab 60a structured to be manipulated by the rider's hand (e.g., by a finger or thumb). Release lever 36 is operated by rotating release lever 36 either clockwise or counterclockwise from the start position to a finish position determined by the sides of notch 31d in body portion 31.

As shown in FIGS. 3 and 10, a first pawl 66a is pivotably mounted to the lower surface of release lever body 60 and biased toward engagement with the plurality of first intermediate member ratchet teeth 66b by a biasing member in the form of a coil spring 66d, and a second pawl 68a is pivotably mounted to the lower surface of release lever body 60, radially inwardly from first pawl 66a, and biased toward engagement with the plurality of second intermediate member ratchet teeth 68b by a biasing member in the form of a coil spring 68d. First pawl 66a, coil spring 66d and the plurality of first intermediate member ratchet teeth 66b form a first one-way clutch 66 for transmitting only counterclockwise rotation of release lever 36 to intermediate member 62, and second pawl 68a, coil spring 68d and the plurality of second intermediate member ratchet teeth 68b form a second one-way clutch 68 for transmitting only clockwise rotation of release lever 36 to intermediate member 62. A pawl control plate 70 is nonrotatably mounted to support shaft 35 to ensure that only one of the one-way clutches 66 or 68 operate at a particular time. For example, when release lever 36 is rotated clockwise (in the direction B), then first pawl 66a of first one-way clutch 66 is pressed upwardly by pawl control plate 70 to prevent first pawl 66a from engaging any of the plurality of first intermediate member ratchet teeth 66b so that only second pawl 68a is allowed to engage the plurality of second intermediate member ratchet teeth 68b and thereby transmit rotation of release lever 36 to intermediate member 62 in the clockwise direction. Similarly, when release lever 36 is rotated counterclockwise (in the direction A), then second pawl 68a of second one-way clutch 68 is pressed upwardly by pawl control plate 70 to prevent second pawl 68a from engaging any of the plurality of second intermediate member ratchet teeth 68b so that only first pawl 66a is allowed to engage the plurality of first intermediate member ratchet teeth 66b and thereby transmit rotation of release lever 36 to intermediate member 62 in the counterclockwise direction.

Winding lever 38 includes a mounting opening 38b rotatably mounted around support shaft 35 at the stepped surface between middle diameter portion 35b and large diameter portion 35c. As noted above, winding lever 38 is fitted within a notch 31e of body portion 31 and within lever accommodating recess 44c of positioning member 44 between positioning member 44 and winding member 32 so that notch 31e and lever accommodating recess 44c limit a range of motion of winding lever 38. A biasing member in the form of a coil spring 72 is placed on the counterclockwise side of winding lever 38 to bias winding lever 38 clockwise to a start position. Winding lever 38 extends radially outwardly from body portion 31 in a different direction from release lever 36 and includes an operating tab 38a structured to be manipulated by the rider's hand (e.g., by a finger or thumb). Winding lever 38 is operated by rotating winding lever 38 counterclockwise from the start position determined by the clockwise side of notch 31e to a finish position determined by the counterclockwise side of notch 31e.

Figure 9:
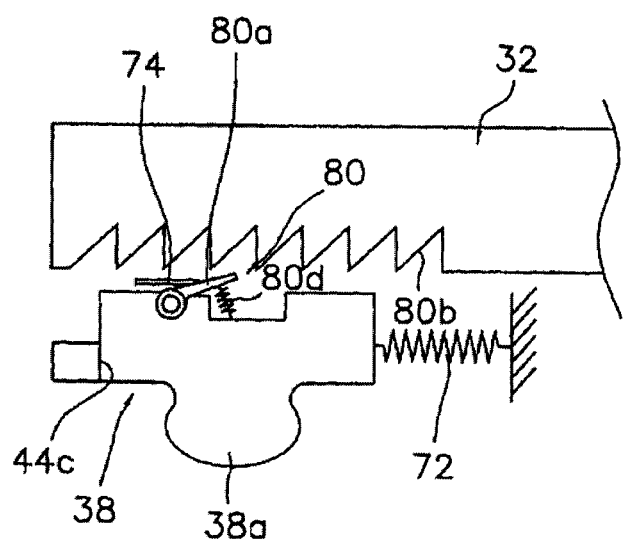
FIG. 9 is a schematic view of a one-way clutch associated with a winding lever.

As shown in FIGS. 3 and 9, a winding lever pawl 80a is pivotably mounted to the upper surface of winding lever 38 and biased toward engagement with second winding member ratchet unit 80b by a biasing member in the form of a coil spring 80d. Winding lever pawl 80a, coil spring 80d and second winding lever ratchet unit 80b form a one-way clutch 80 for transmitting only counterclockwise rotation of winding lever 38 to winding member 32. A pawl control plate 74 is nonrotatably mounted to contact members 52 on positioning member 44 to keep winding lever pawl 80a out of engagement with second winding member ratchet unit 80b when winding lever 38 is in the start position.

Rotating winding lever 38 counterclockwise in FIG. 3 (to the right in FIG. 9) from the start position to the finish position operates winding member 32 in the cable pulling direction. More specifically, when winding lever 38 leaves the winding member start position, winding lever pawl 80a moves off of pawl control plate 74 engages one of the plurality of ratchet teeth forming second winding member ratchet unit 80b. Thereafter, winding member 32 rotates together with winding lever 38 in the cable pulling direction. At the same time, the inclined surfaces of positioning teeth 44b slide relative to the inclined surfaces 40c of their adjacent ratchet teeth 40a, and positioning member 44 is pushed downwardly against the biasing force of springs 54 until positioning teeth 44b move over the tips of their corresponding ratchet teeth 40a and are located in the next space between adjacent ratchet teeth 40a. Them, winding member 32 is located in a destination operating position corresponding to a destination rear sprocket 19b. If desired, the rider may continue pressing winding lever 38 counterclockwise, in which case winding member 32 will rotate to a plurality of destination operating positions.

Rotating release lever 36 either clockwise or counterclockwise operates winding member 32 in the cable releasing direction. For example, when the rider presses release lever 36 counterclockwise with his or her thumb, then first pawl 66a of first one-way clutch 66 engages one of the plurality of first intermediate member ratchet teeth 66b, thus rotating intermediate member 62 counterclockwise together with release lever 36. When the rider presses release lever 36 clockwise with his or her index finger, then second pawl 68a of second one-way clutch 68 engages one of the plurality of second intermediate member ratchet teeth 68b, thus rotating intermediate member 62 clockwise together with release lever 36. In either case, side surfaces 62b of intermediate member cam teeth 62a slide against side surfaces 46c of release member cam teeth 46b, thus pushing release element 46 downwardly against the biasing force of springs 56 away from intermediate member 62. FIGS. 5-8 show the operation of rear shift control device 16 when release lever 36 is rotated counterclockwise (intermediate member 62 moves to the right in FIGS. 5-8).

Figure 5:
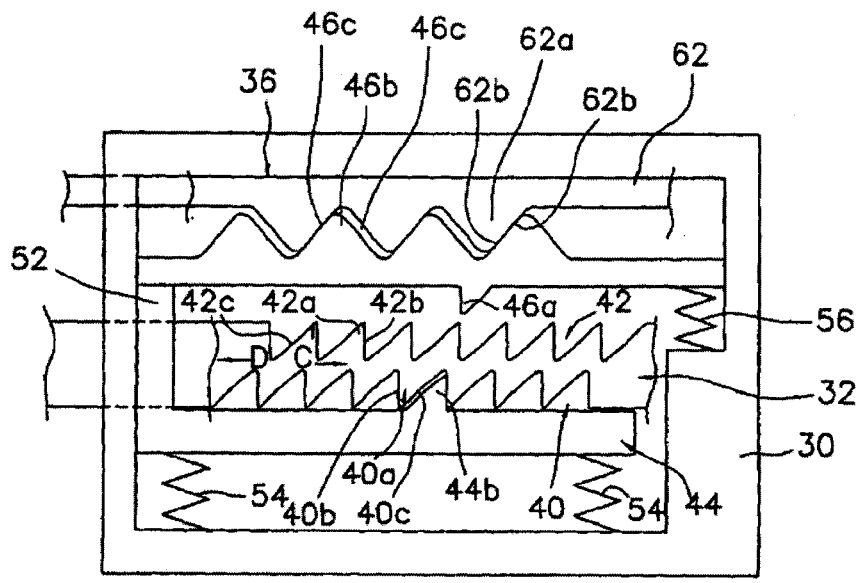
Figure 6:
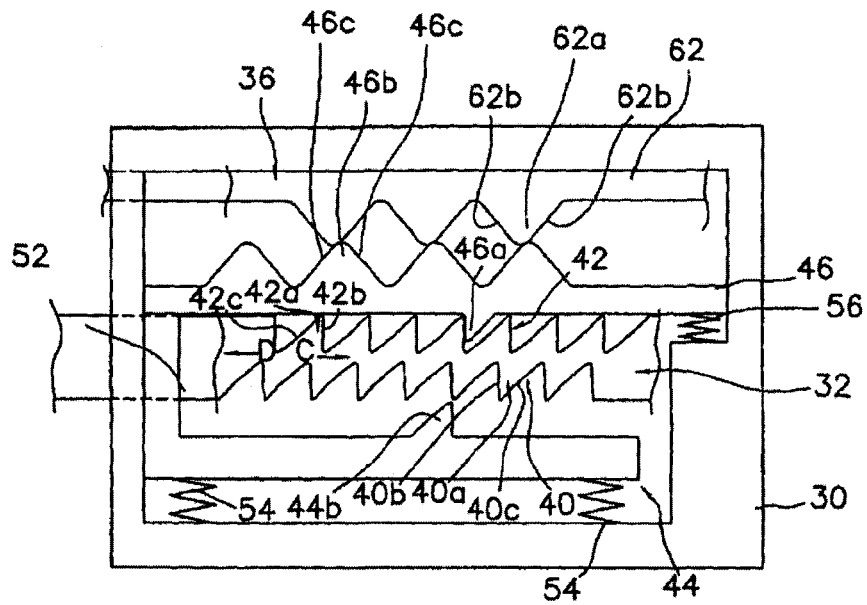
Figure 7:
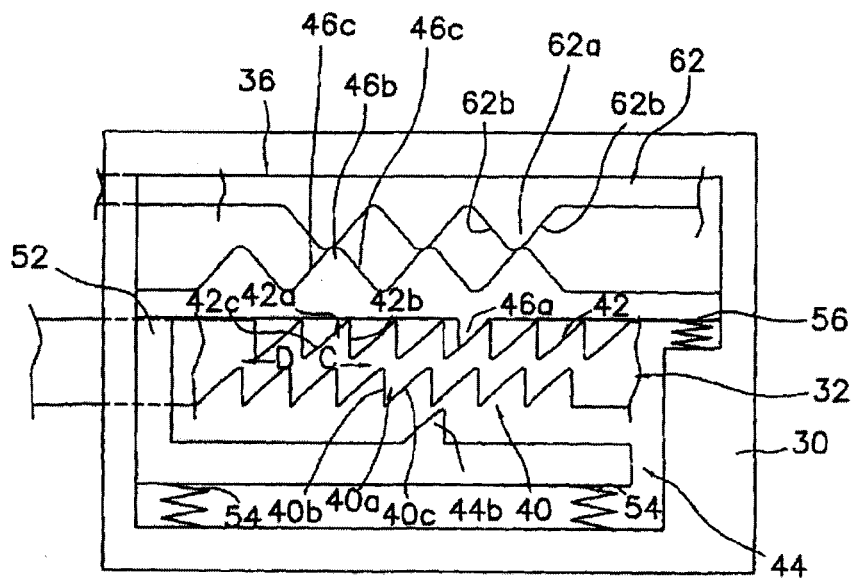

When release element 46 moves downward this movement is communicated to positioning member 44 through contact members 52, thereby also moving positioning member 44 downwardly against the biasing force of springs 54 as shown in FIG. 5. Eventually, positioning pawls 44b on positioning member 44 disengage from ratchet teeth 40a on winding member 32 (before intermediate member cam teeth 62a and release member cam teeth 46b reach their respective apexes), and winding member 32 rotates clockwise (to the left in FIG. 6) in the cable unwinding direction D in accordance with the biasing force of spring 50. As winding member 32 continues rotating clockwise, the inclined surfaces of tooth engaging pawls 46a on release element 46 engage corresponding inclined surfaces 42c of corresponding ratchet teeth 42a on winding member 32 as shown in FIG. 7, thereby stopping rotation of winding member 32.

Figure 8:
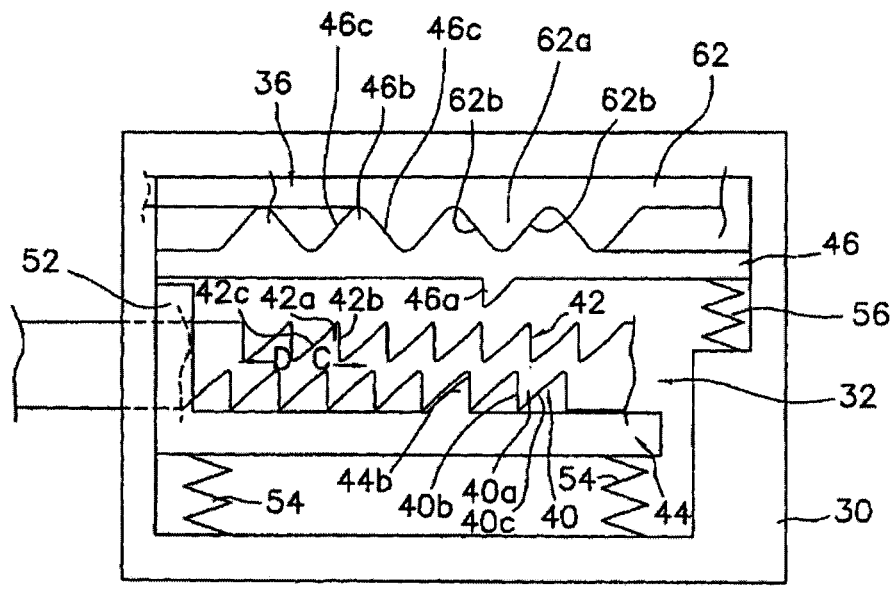

If the rider removes his or her hand from release lever 36 at this point, springs 56 push release element 46 upwardly, and coil springs 54 push positioning member 44 upwardly, thereby disengaging tooth engaging pawls 46a on release element 46 from ratchet teeth 42a on winding member 32. Winding member 32 then continues rotating in the cable unwinding direction D until positioning pawls 44b on positioning member 44 reengage with corresponding ratchet teeth 40a on winding member 32 as shown in FIG. 8 to set winding member 32 in a destination operating position corresponding to a desired rear sprocket 19b. Alternatively, the rider may continue pressing release lever 36, in which case the process repeats itself and winding member 32 rotates to a plurality of further destination operating positions.

While the operation of release lever 36 in either the clockwise or counterclockwise direction caused winding member 32 to rotate in the cable releasing direction in this embodiment, the winding direction of inner cable 26a may be reversed in FIG. 3, in which case release lever 36 becomes the winding lever, the winding lever 38 becomes the release lever, and cable pulling may be accomplished by rotating lever 36 either clockwise or counterclockwise. In this case, when rear derailleur 18 exerts a biasing force on inner cable 26a, the biasing force of coil spring 50 needs to be higher than that of the biasing force created by the derailleur.

Figure 11:
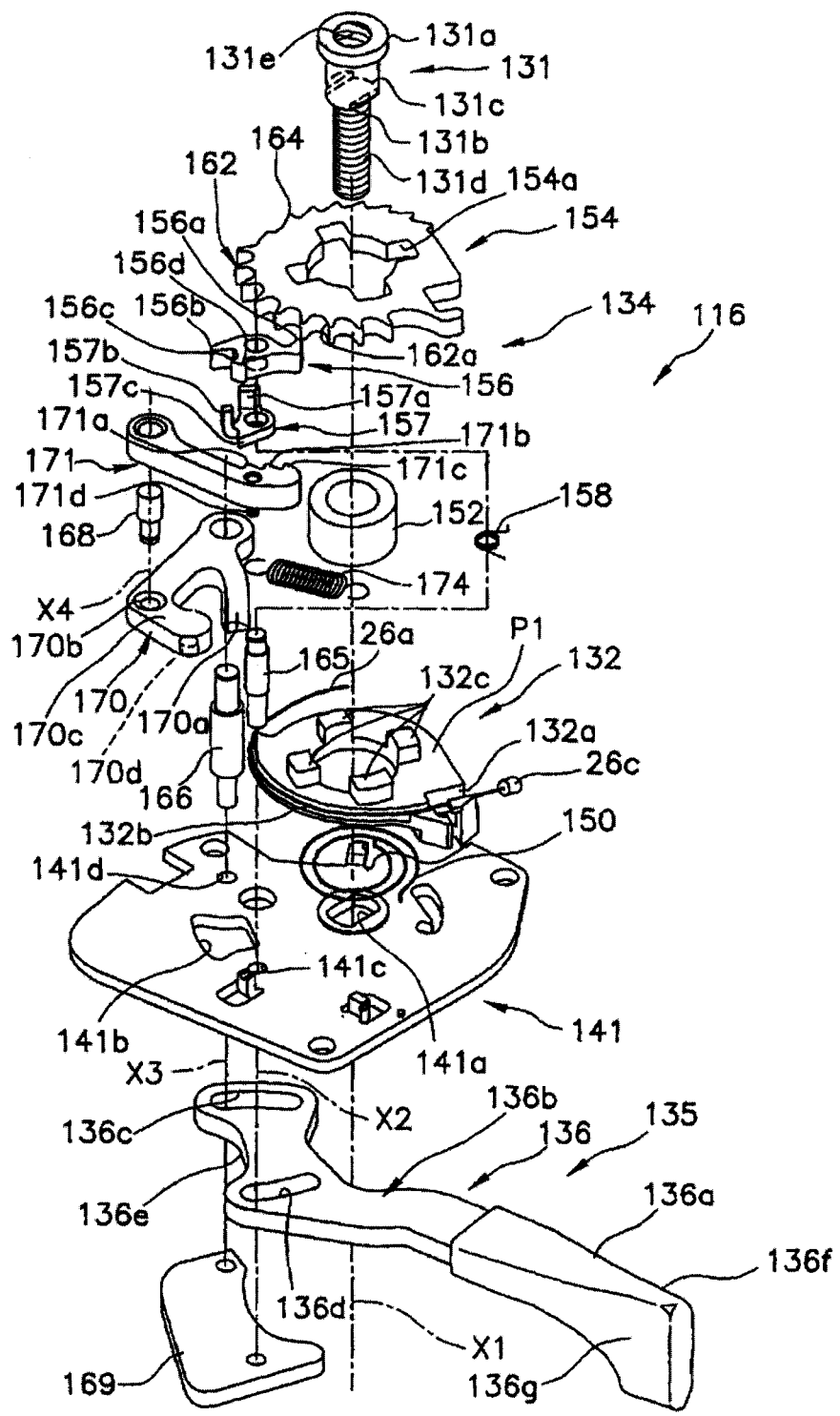
FIG. 11 is an exploded view of a second embodiment of a shift control device.

In the above embodiment, the various components that perform the positioning and releasing operation moved perpendicular to the plane of rotation of winding member 32. FIG. 11 is an exploded view of a second embodiment of a rear shift control device 116 wherein the various components that perform the positioning and releasing operation move parallel to a plane P1 of rotation of a winding member 132. Shift control device 116 includes a mounting member 130 (FIG. 2) having generally the same outer shape as mounting member 30 in the first embodiment. Another mounting member in the form of a mounting bracket 141 is mounted within an interior space of mounting member 130 in a convenient manner. Mounting member 130 may be formed from a synthetic resin, and mounting bracket 141 may be formed from metal, for example. A support shaft 131 is connected to mounting member 130 and extends in a direction of a first axis X1. More specifically, support shaft 131 includes a circular head 131a with a threaded opening 131e, a rotation support portion 131c, a pair of parallel rotation inhibiting flats 131b formed at the lower end of rotation support portion 131c for nonrotatably engaging a corresponding pair of rotation inhibiting flats formed by a slot-shaped opening 141a in mounting bracket 141, and a threaded portion 131d disposed below rotation support portion 131c. A bolt (not shown) is screwed into threaded opening 131e through mounting member 130 to secure support shaft 131 to mounting member 130.

Winding member 132 is mounted to support shaft 131 through a bushing 152 for rotation around first axis X1 in a cable pulling (winding) direction and a cable releasing (unwinding) direction of inner cable 26a. A winding member ratchet unit 154 has a plurality of recesses 154a that engage a corresponding plurality of projections 132c formed in winding member 132 so that winding member 132 and winding member ratchet unit 154 rotate as a unit. One of the four projections 132c has a circumferential length different from the others so that the rotational phases of winding member ratchet unit 154 and winding member 132 may be reliably matched. An intermediate member 170 is rotatably supported to an upper portion of a pivot shaft 166 that has a lower portion extending through an opening 141d in mounting bracket 141, and a release element 171 in the form of a release lever is rotatably mounted to a pivot shaft 168 attached to intermediate member 170. A positioning member in the form of a positioning pawl 156 and a tooth engaging member in the form of a tooth engaging pawl 157 both are rotatably mounted to an upper portion of a pivot shaft 165 that has a lower portion extending through an opening 141c in mounting bracket 141. As a result, positioning pawl 156 and tooth engaging pawl 157 rotate around an axis X2 that extends along pivot shaft 165, and intermediate member 170 rotates around an axis X3 that extends along pivot shaft 166. In this embodiment, axes X1, X2 and X3 are spaced apart parallel to each other. The lower portions of pivot shafts 165 and 166 extend through guides in the form of arcuate slots 136d and 136c, respectively, formed in a release lever body 136 of a release lever 135 and are fastened to a support plate 169. As with release lever 36 in the first embodiment, release lever 135 operates winding member 132 in the cable releasing direction when release lever 135 is rotated in either a clockwise or a counterclockwise direction. A winding lever 138 (FIG. 2) operates winding member 132 in the cable pulling direction.

Figure 13:
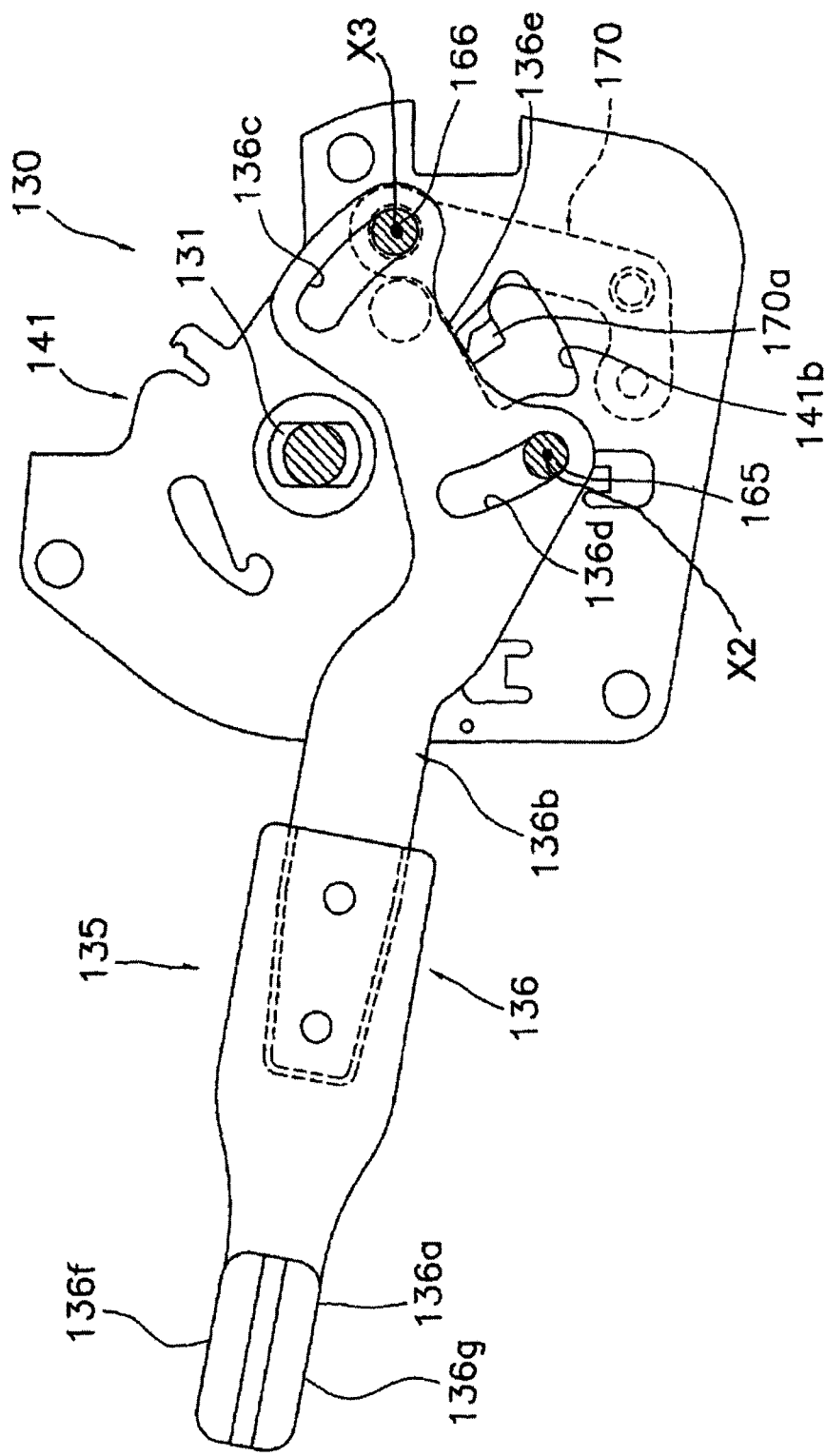
FIG. 13 shows a release lever in a start position.

Release lever body 136 disposed at the lower surface of mounting bracket 141. Release lever body 136 comprises an operating tab 136a and a radially inner body 136b. Operating tab 136a may be formed from synthetic resin, die cast metal or the like, and it includes operating surfaces 136f and 136g structured to be contacted by the rider's hand (e.g., by a finger or thumb). Radially inner body 136b may be formed from metal such as stainless steel alloys or steel, and it is slightly bent in the middle so as to be placed around support shaft 131. Radially inner body 136b includes arcuate slots 136c, 136d and a control surface 136e (an example of an operating location) that function in a manner described below. As shown in FIG. 13, slot 136c has an arcuate shape centered on the lower end of slot 136d, and slot 136d has an arcuate shape centered on the lower end of slot 136c.

Winding member 132 may comprise a ring-shaped member formed from a synthetic resin such as a polyacetal resin. Winding member 132 includes, at an outer peripheral surface thereof, a cable coupling portion 132a that locks a cable nipple 26c secured to a tip of inner cable 26a, and a cable winding groove 132b for winding inner cable 26a. A biasing member in the form of a torsion coil spring 150 biases winding member 132 in a cable releasing direction. Spring 150 has one end fixed to winding member 132 and another end fixed to mounting bracket 141.

Winding member ratchet unit 154 may include, for example, nine radially extending positioning teeth 162 and eight radially extending drive teeth 164 corresponding to the number of shift positions of rear derailleur 18, and they are spaced accordingly. Positioning pawl 156 rotates between an engaged position, shown in FIG. 12, for engaging positioning teeth 162, and a disengaged position, shown in FIG. 16, for disengaging from positioning teeth 162. Positioning pawl 156 is biased counterclockwise in FIG. 11 toward the engaged position by a biasing member in the form of a torsion coil spring 158. Positioning teeth 162 on winding member ratchet unit 154 and positioning pawl 156 form a positioning unit 134 for maintaining winding member 132 in selected ones of a plurality of operating positions. Tooth engaging pawl 157 rotates between an engaged position, shown in FIG. 16, for engaging positioning teeth 162, and a disengaged position, shown in FIG. 12, for disengaging from positioning teeth 162.

Positioning pawl 156 includes a positioning pawl member 156a that contacts an engagement surface 162a of positioning teeth 162 to prevent winding member 132 and winding member ratchet unit 154 from rotating in the cable releasing direction, a pair of regulating protrusions 156b and 156c circumferentially spaced apart from each other for controlling the motion of tooth engaging pawl 157 and for being controlled by the motion of tooth engaging pawl 157, and a control protrusion 156d that engages release element 171. Control protrusion 156d slightly protrudes toward release element 171. These components function in a manner discussed below.

Figure 16:
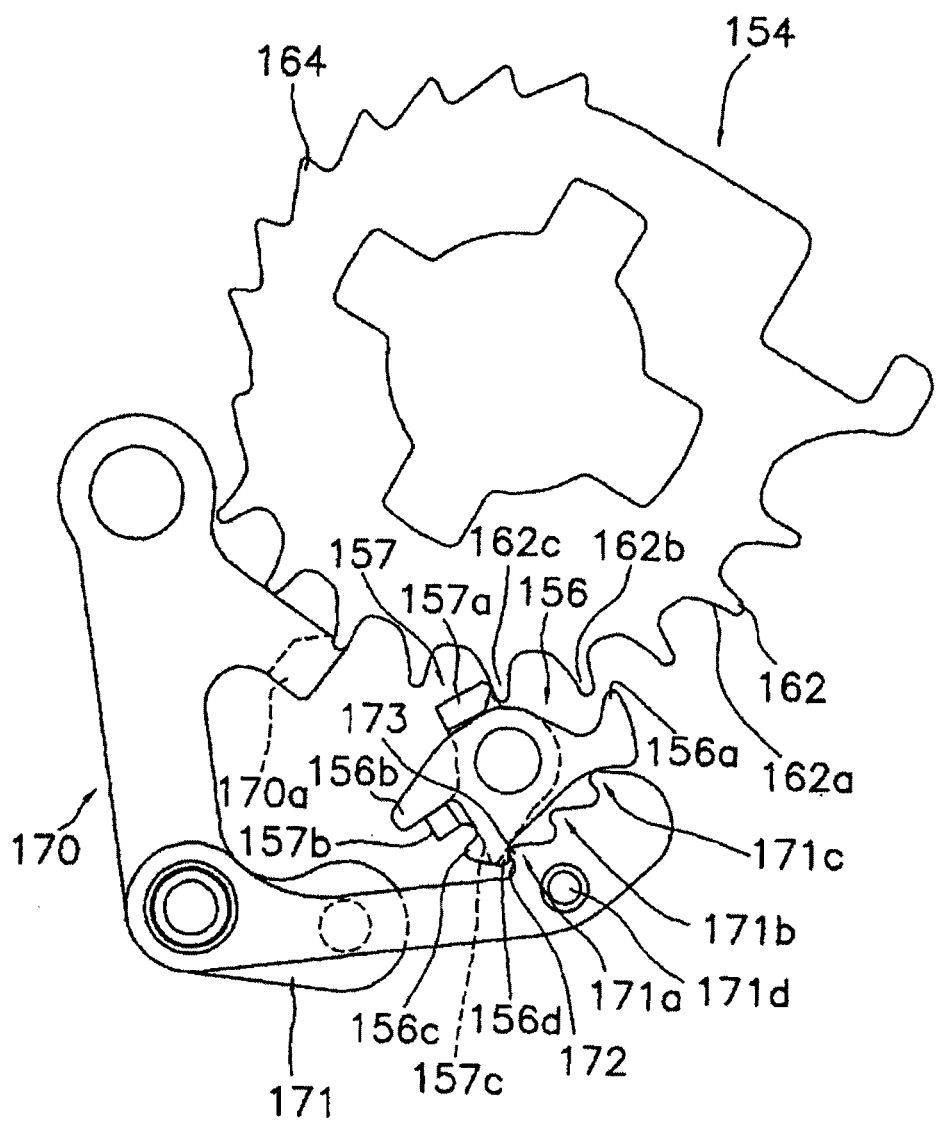
FIG. 16 shows the positioning unit when the release lever is in the start position.

Tooth engaging pawl 157 is rotatably mounted to pivot shaft 165 below positioning pawl 156. Tooth engaging pawl 157 comprises a tooth engaging pawl member 157a that is bent upward from below positioning pawl 156 in FIG. 11 for engaging selected ones of the plurality of positioning teeth 162, a regulating member 157b bent upward so as to be placed between the pair of regulating protrusions 156b and 156c of positioning pawl 156 so that tooth engaging pawl 157 rotates within a predetermined range (for example, within a range of 5 to 10 degrees) relative to positioning pawl 156, and a release cam member 157c. As shown in FIG. 16, regulating protrusion 156c of positioning pawl 156 overlaps release cam member 157c of tooth engaging pawl 157 and hides release cam member 157c when regulating protrusion 156b contacts regulating member 157b. These components function in a manner described below.

Figure 12:
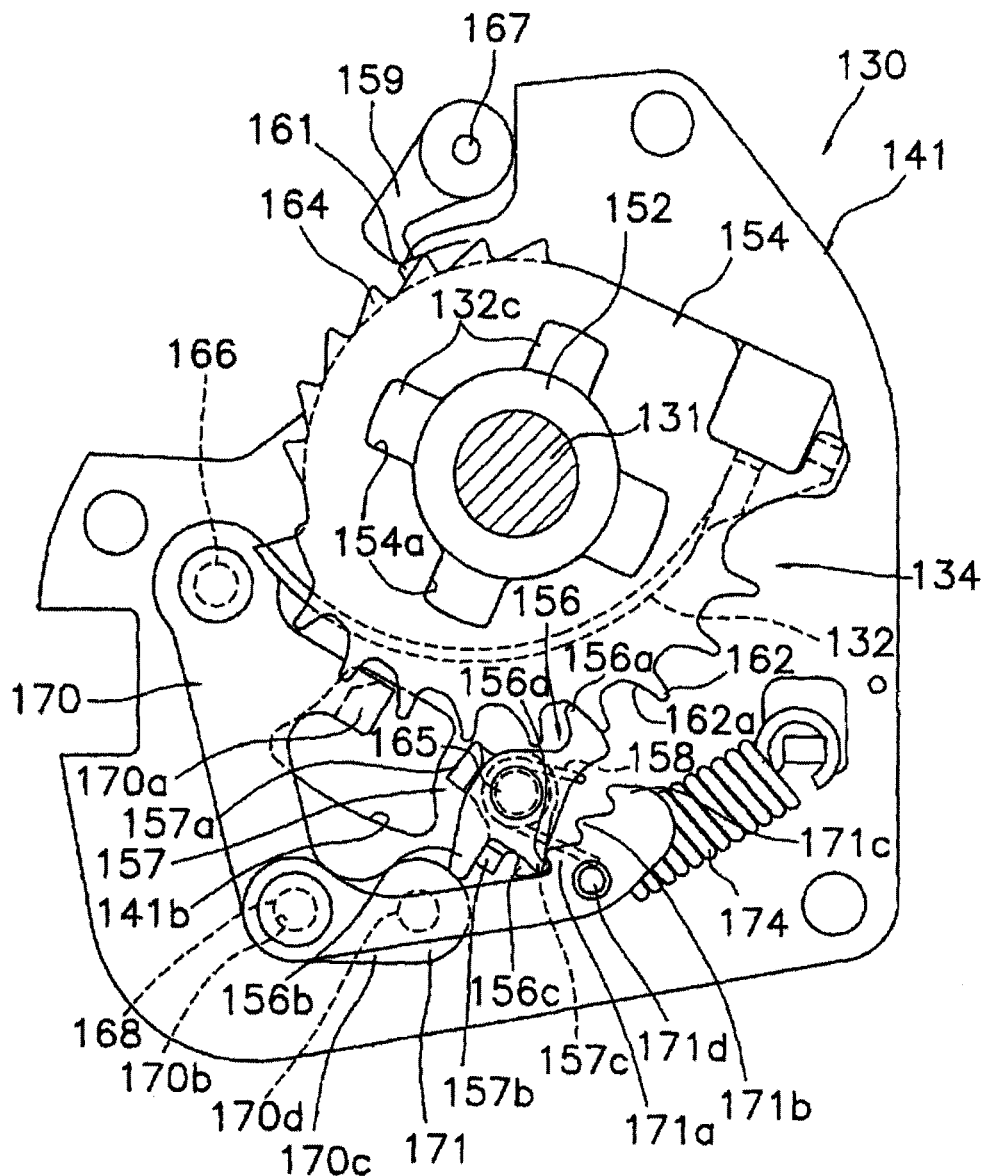
FIG. 12 shows a positioning unit maintaining a cable coupling member in a selected operating position.

As shown in FIGS. 11 and 12, intermediate member 170 comprises a lever engaging member 170a, a connecting member 170b, an upper support member 170c, and a lower support member 170d. Lever engaging member 170a bends downwardly and extends thorough an opening 141b in mounting plate 141 for engaging control surface 136e of release lever 135. Connecting member 170b mounts pivot shaft 168 for rotatably supporting release element 171. Upper support member 170c provides a supporting surface for release element 171 to prevent rattling during relative movement between intermediate member 170 and release element 171, and lower support member 170d contacts the upper surface of mounting plate 141 to prevent rattling during relative movement between intermediate member 170 and mounting plate 141.

Release element 171 includes a plurality of (e.g., three) release members 171a-171c arranged in substantially a straight line at a tip thereof, and a spring mounting portion 171d. The three release members 171a-171c are provided so that three shift operations may be performed during a single movement of release lever 135 (and release element 171) from a start position to a finish position. For example, rear derailleur 18 can be moved from ninth gear to sixth gear with a single stroke of release lever 135.

Figure 17:
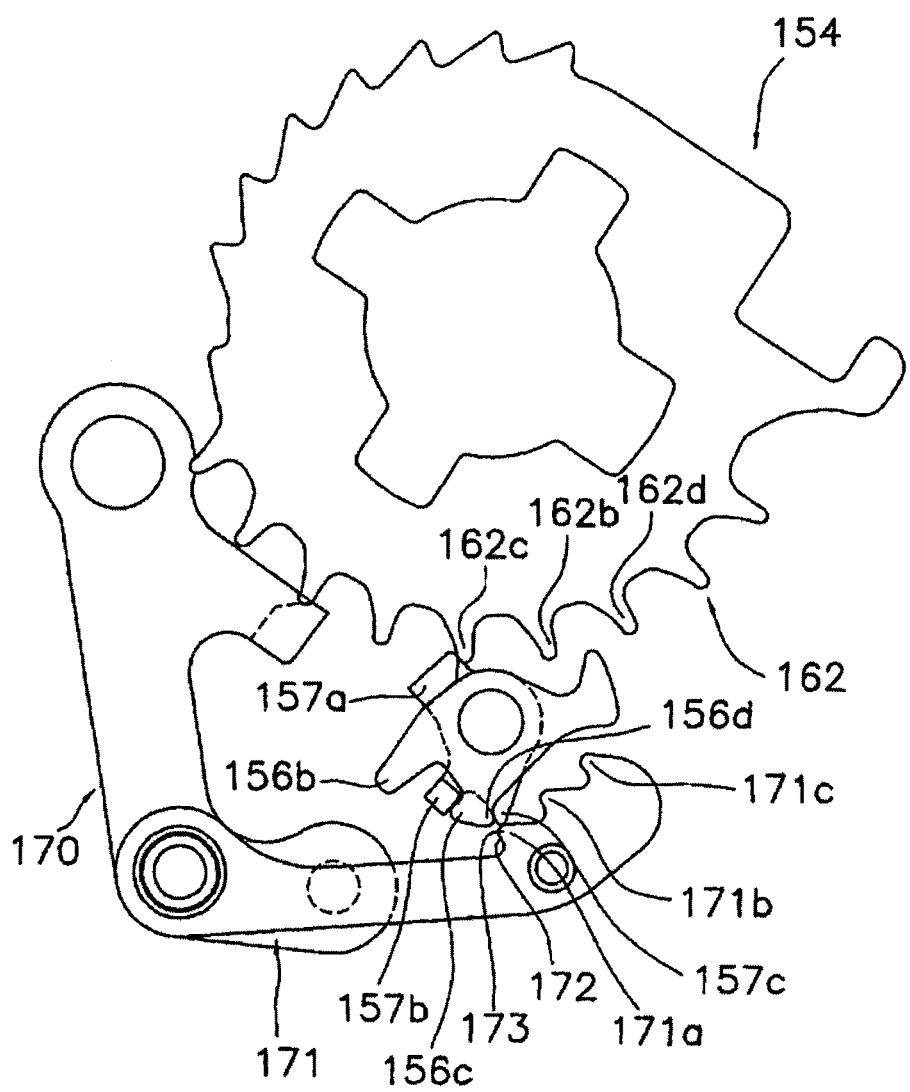
FIGS. 17-21 show the positioning unit during multiple cable releasing operations.

As shown in FIG. 17, each of the release members 171a-171c includes a first control member 172 and a directly adjacent second control member 173. As discussed below, first control member 172 engages control protrusion 156*d* of positioning pawl 156 to release the engagement between positioning pawl 156 and one of the plurality of positioning teeth 162 on winding member ratchet unit 154, and second control member 173 is driven by release cam member 157*c* of tooth engaging pawl 157 to allow positioning pawl 156 to engage another one of the plurality of positioning teeth 162 on winding member ratchet unit 154.

Spring mounting member 171*d* is connected to one end of a biasing member in the form of a coil spring 174. The other end of coil spring 174 is connected to mounting bracket 141. Coil spring 174 biases release element 171 counterclockwise and radially inwardly toward support shaft 131. Since release element 171 is mounted to intermediate member 170 through pivot shaft 168, coil spring 174 also biases intermediate member 170 counterclockwise and radially inwardly toward support shaft 131 such that lever engaging member 170*a* of intermediate member 170 contacts control surface 136*e* of release lever 135, thus biasing release lever 135 toward support shaft 131 in the orientation shown in FIG. 13.

Figure 14:
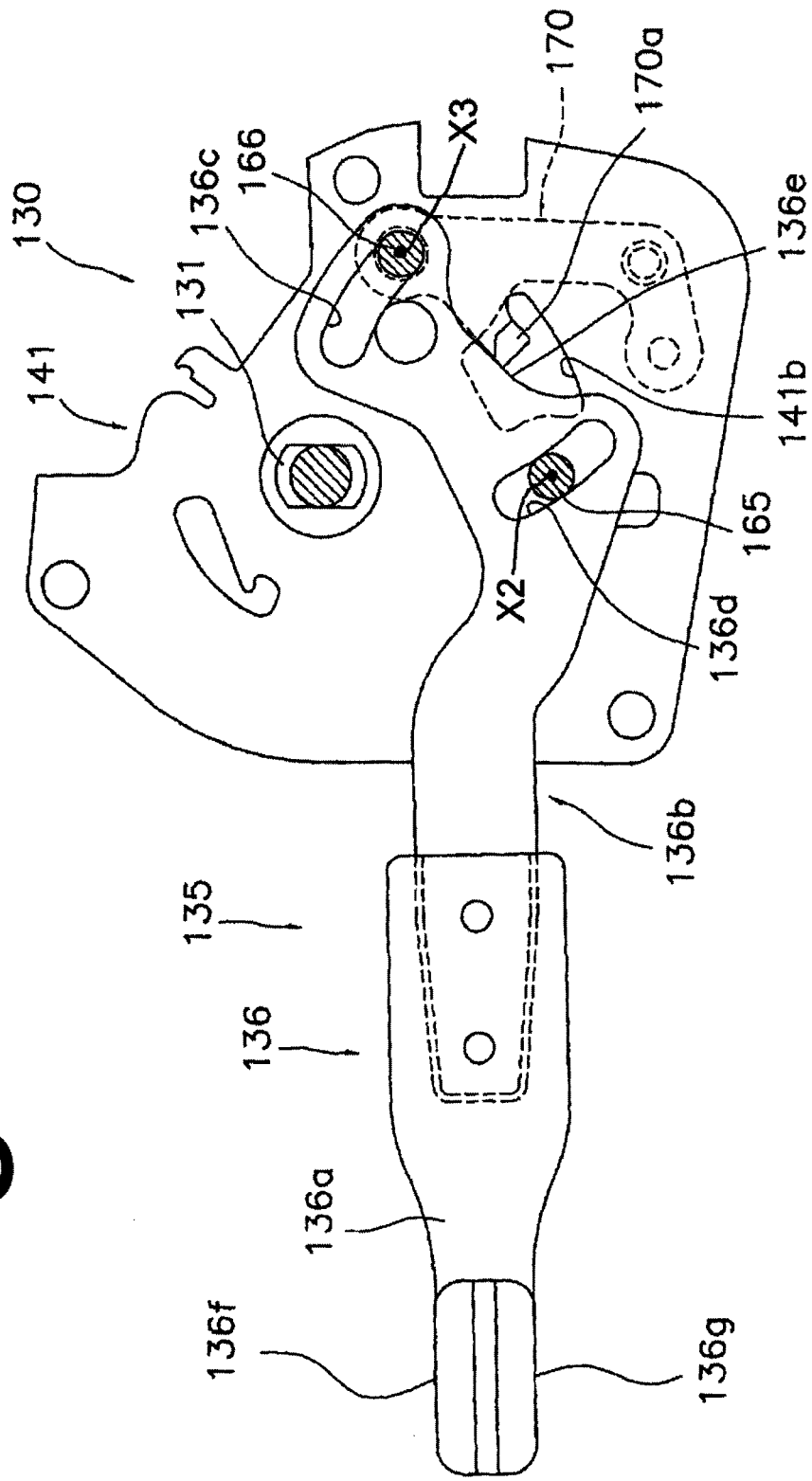
FIG. 14 shows the release lever being moved in a first direction.
Figure 15:
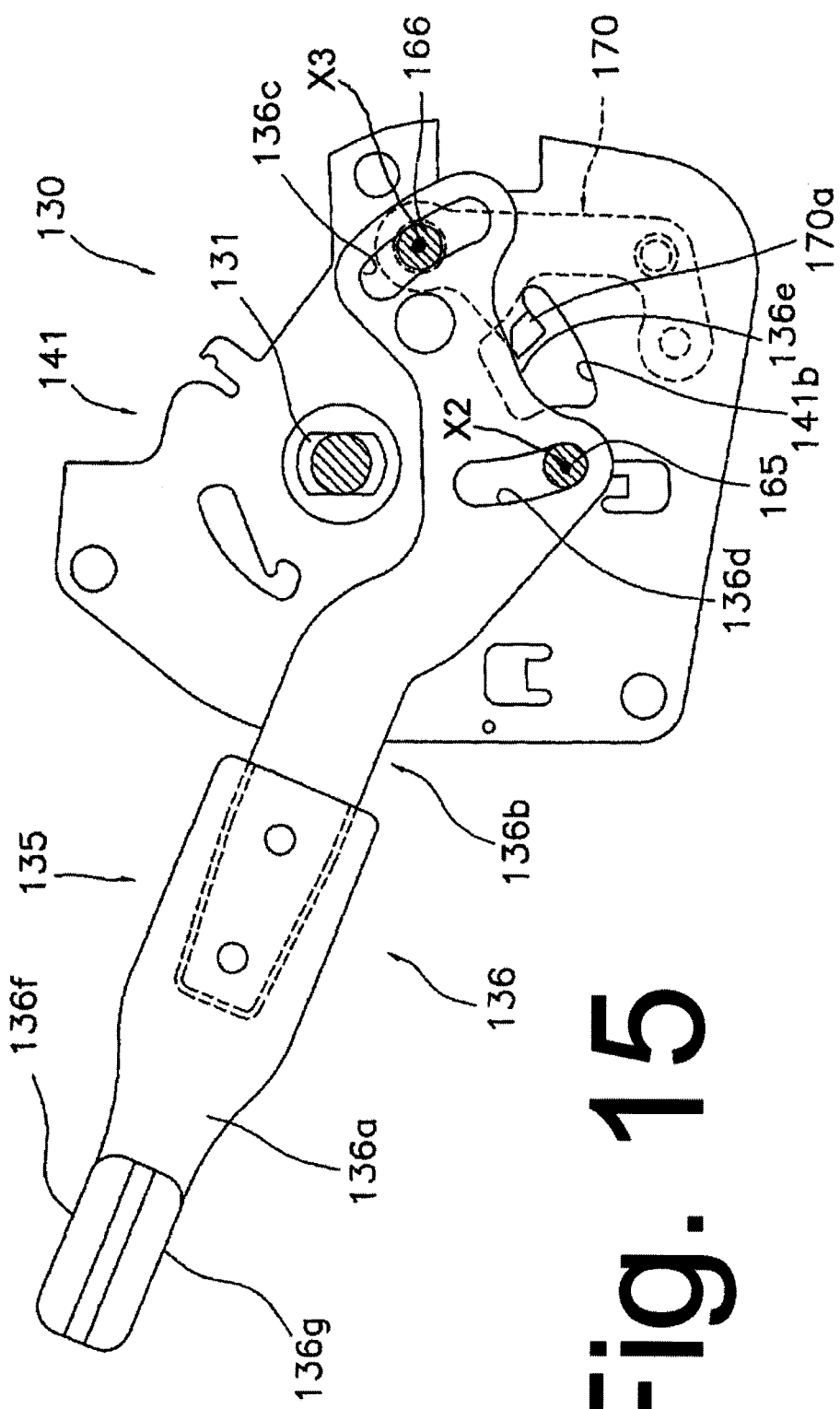
FIG. 15 shows the release lever being moved in a second direction.

FIG. 13 shows release lever 135 in a neutral position as a result of the biasing force of coil spring 174 transmitted through release element 171 and intermediate member 170. In this position, pivot shafts 165 and 166 are located at the lower ends of slots 136*d* and 136*c*, respectively. Since the biasing force of coil spring 174 is applied to control surface 136*e* of release lever 135 via lever engaging member 170*a* of intermediate member 170, release lever 135 rotates centered around pivot shaft 166 and axis X3 as shown in FIG. 14 when the rider presses operating surface 136*f* to rotate release lever 135 counterclockwise. On the other hand, release lever 135 rotates centered around pivot shaft 165 and axis X2 as shown in FIG. 15 when the rider presses operating surface 136*g* to rotate release lever 135 clockwise. In both cases, control surface 136*e* always is in contact with lever engaging member 170*a*, and control surface 136*e* causes lever engaging member 170*a* to move diagonally downward to the right in FIG. 13, thereby rotating intermediate member 170 and release element 171 clockwise in FIG. 11. As a result, winding member 132 is rotated in the cable releasing direction when release lever 135 is rotated in either the clockwise or the counterclockwise direction shown in FIG. 13.

Since the components activated by release lever 135 are not disposed on support shaft 131 in addition to winding member 132 and winding member ratchet unit 154, the axial length of support shaft 131 may be reduced, thereby reducing the axial thickness of rear shift control device 116. While a single spring 174 biases release lever 136, intermediate member 170, and release element 171 in this embodiment, a separate biasing member may be provided for biasing each member.

Though not shown in FIG. 11, winding lever 138 is mounted to support shaft 131 above winding member ratchet unit 154 for rotation from a start position to a finish position. A drive pawl 159 (FIG. 12) is rotatably mounted to winding lever 138 through a pivot shaft 167, and a biasing member such as a torsion coil spring (not shown) biases drive pawl 159 toward engagement with the plurality of drive teeth 164. However, drive pawl 159 is maintained in a disengaged position when winding lever 138 is located in the start position by a pawl control plate 161 mounted to mounting bracket 141 in a known manner. A biasing member (not shown) biases winding lever 138 toward the operation start position (clockwise in FIG. 12) in any known manner.

When the rider rotates winding lever 138 from the start position toward the finish position, drive pawl 159 moves off of the end of pawl control plate 161 and engages one of the plurality of drive teeth 164 to rotate winding member 132 in the cable pulling direction (counterclockwise in FIG. 12). At that time, the positioning tooth 162 adjacent to the positioning tooth 162 previously engaged by positioning pawl member 156*a* of positioning pawl 156 contacts positioning pawl member 156*a*, rotates positioning pawl 156 clockwise, and passes by positioning pawl member 156*a*. After the positioning tooth 162 passes by positioning pawl member 156*a*, positioning pawl 156 rotates counterclockwise to the engaged position. If the rider releases winding lever 138 at this time, then winding member 132 and winding member ratchet unit 154 rotate slightly clockwise, and positioning pawl member 156*a* abuts against the adjacent positioning tooth 162 to maintain winding member 132 in the new destination operating position. If desired, the rider may continue rotating winding lever 138, in which case winding member 132 rotates through multiple operating positions to a destination operating position determined by when the rider releases winding lever 138.

As noted above, the rider causes winding member 132 to rotate in the cable releasing direction by rotating release lever 135 either clockwise or counterclockwise from the start (neutral) position shown in FIG. 13, thereby causing control surface 136*e* of release lever 135 to move lever engaging member 170*a* of intermediate member 170 diagonally downward to the right in FIG. 13 so that intermediate member 170 and release element 171 rotate clockwise in FIG. 11 (counterclockwise in FIG. 13). As shown in FIG. 16, when intermediate member 170 rotates clockwise, it pulls release element 171 to the left. In other words, release element 171 moves linearly (i.e., movement other than movement around a fixed rotational axis). This causes first control member 172 of release member 171*a* of release element 171 to engage control protrusion 156*d* of positioning pawl 156 to rotate positioning pawl 156 clockwise around pivot shaft 165 from the engaged position shown in FIG. 12 to the disengaged position shown in FIG. 16. At the same time, first control member 172 of release member 171*a* of release element 171 also contacts release cam member 157*c* of tooth engaging pawl 157 to cause tooth engaging pawl 157 to rotate clockwise so that tooth engaging pawl member 157*a* moves from the disengaged position shown in FIG. 12 to the engaged position shown in FIG. 16.

When positioning pawl member 156*a* of positioning pawl 156 disengages from its previously engaged positioning tooth 162, i.e., positioning tooth 162*b* in FIG. 16, winding member ratchet unit 154 and winding member 132 rotate clockwise in the cable releasing direction in accordance with the biasing force of spring 150 until positioning tooth 162*c* presses against tooth engaging pawl member 157*a* of tooth engaging pawl 157. Since tooth engaging pawl 157 can rotate relative to positioning pawl 156, positioning tooth 162*c* causes tooth engaging pawl 157 to rotate counterclockwise so that regulating member 157*b* of tooth engaging pawl 157 moves from contacting regulating protrusion 156*b* of positioning pawl 156 to contacting regulating protrusion 156*c* of positioning pawl 156.

Then, as shown in FIG. 17, release cam member 157*c* of tooth engaging pawl 157 presses against second control member 173 of release member 171*a* of release element 171 to disengage control protrusion 156*d* of positioning pawl 156 from first control member 172 of release member 171*a*. At that time, tooth engaging pawl 157 and positioning pawl 156 rotate counterclockwise together, and positioning pawl member 156a of positioning pawl 156 moves toward the space between positioning teeth 162b and 162d on winding member ratchet unit 154.

Figure 18:
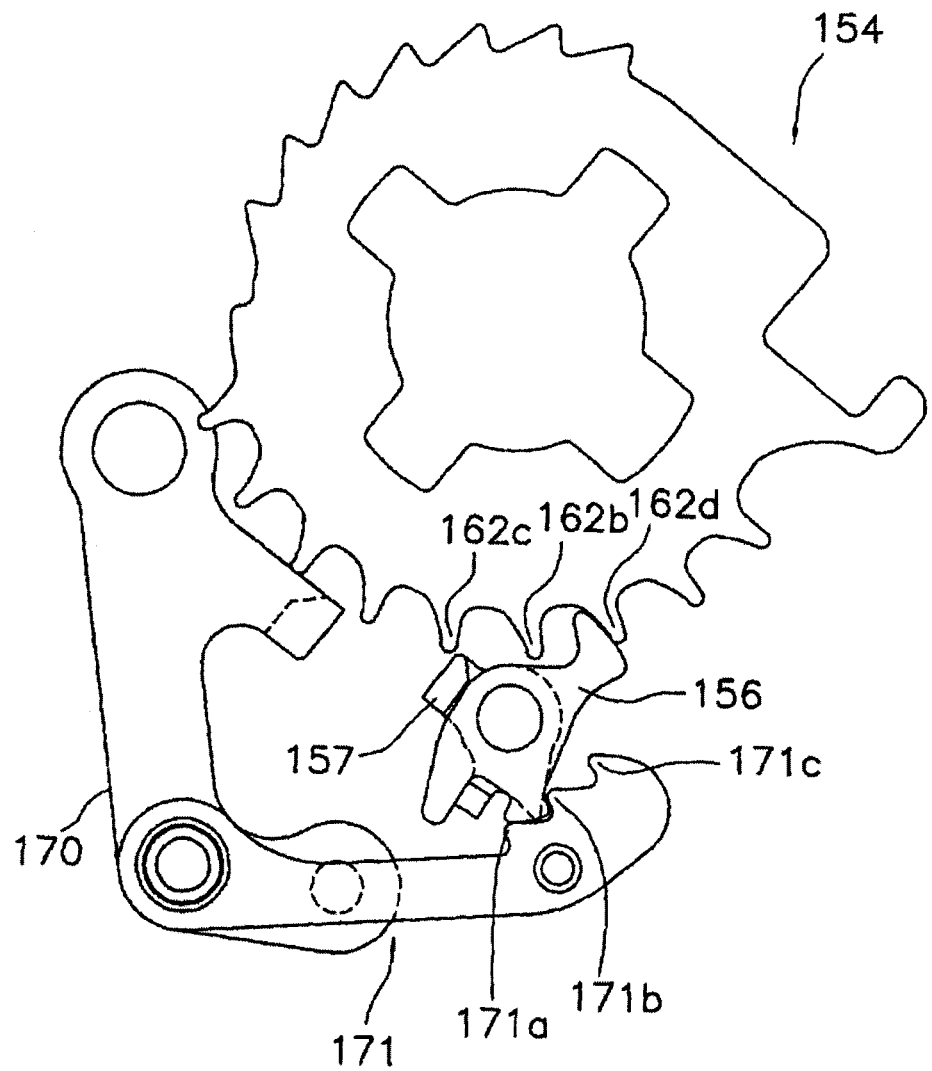

As tooth engaging pawl 157 and positioning pawl 156 continue to rotate together as a result of the force from positioning tooth 162c, tooth engaging pawl member 157a disengages from positioning tooth 162c, and winding member ratchet unit 154 continues rotating until positioning pawl member 156a of positioning pawl 156 contacts positioning tooth 162d as shown in FIG. 18, thereby stopping rotation of winding member ratchet unit 154 and winding member 132 at a destination operating position. At the same time, first control member 172 of release member 171b contacts release cam member 157c of tooth engaging pawl 157, thereby rotating tooth engaging pawl 157 clockwise relative to positioning pawl 156 until regulating member 157b of tooth engaging pawl 157 contacts regulating protrusion 156b of positioning pawl 156 and control protrusion 156d contacts release member 171b of release member 171.

Figure 19:
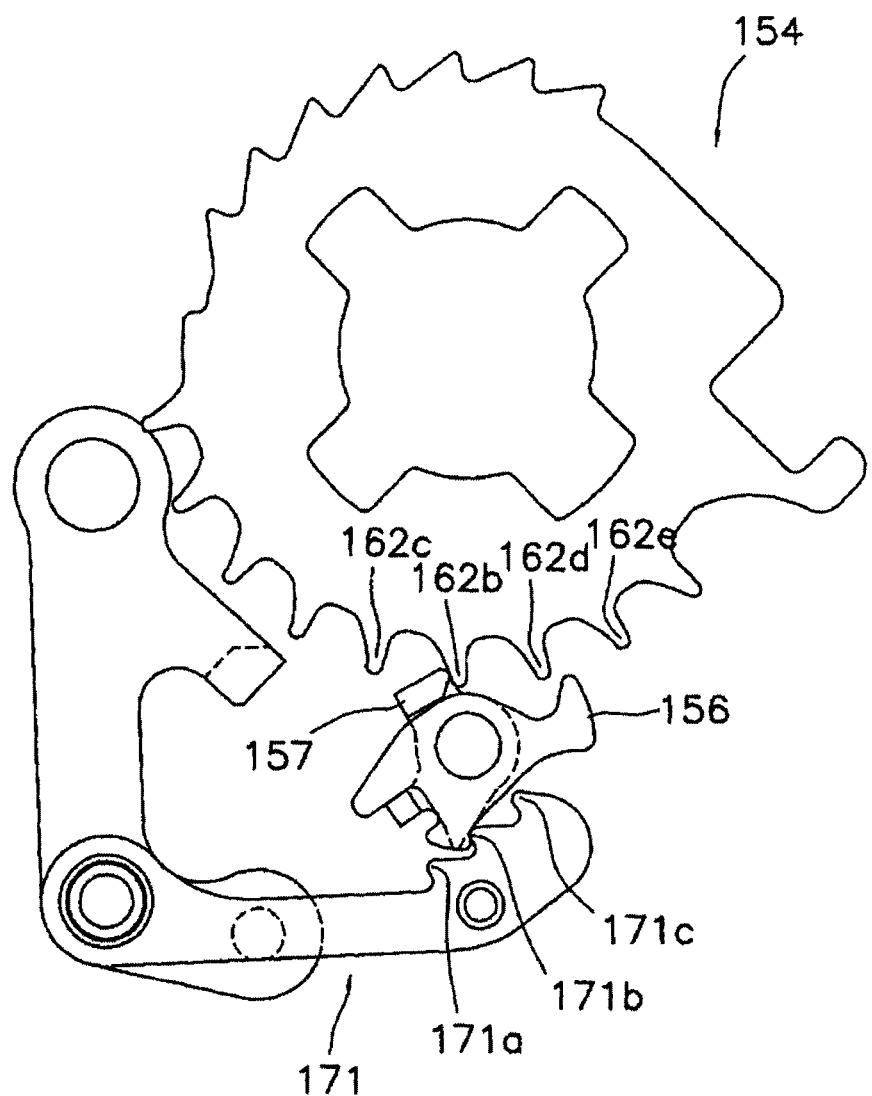
Figure 20:
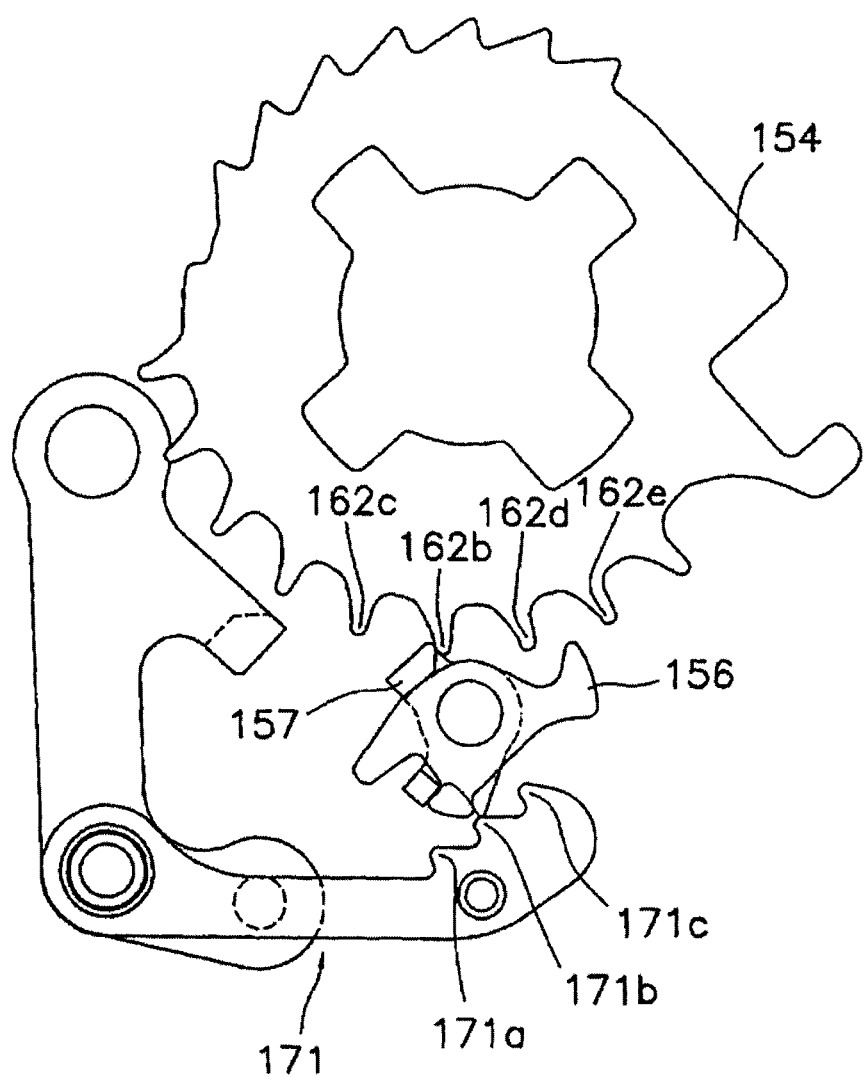
Figure 21:
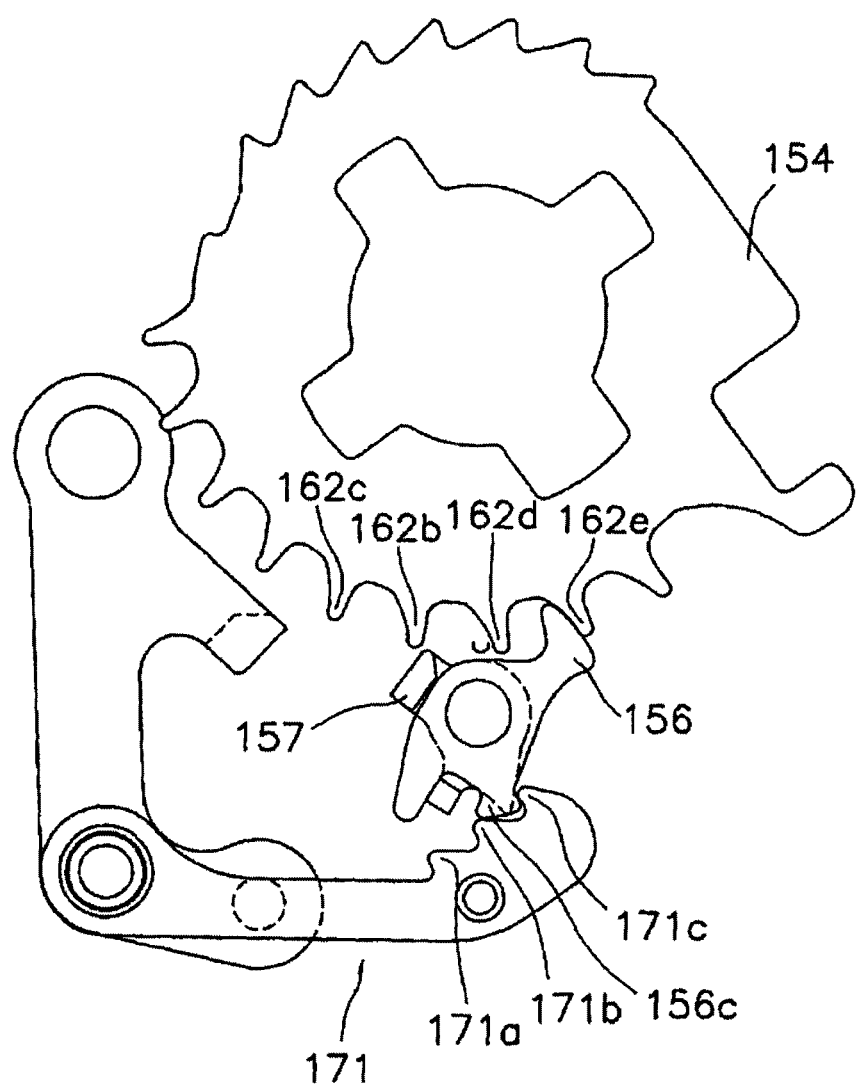

If the rider continues to rotate release lever 135 as shown in FIGS. 19 and 20, the process essentially repeats itself. This time, release member 171b of release element 171 causes positioning pawl 156 to disengage from positioning tooth 162d as shown in FIG. 19, and positioning tooth 162b causes tooth engaging pawl 157 to rotate counterclockwise as shown in FIG. 20 to force positioning pawl 156 back into engagement with a following positioning tooth 162e as shown in FIG. 21. In this position, control protrusion 156d of positioning pawl 156 contacts release member 171c of release member 171.

When the rider releases release lever 135 to finish the releasing operation, the biasing force of spring 174 pulls release member 171, intermediate member 170 and release lever 135 back to the position shown in FIG. 12. During this time, the one or more release members 171a or 171b of release element 171 involved in the release operation merely skip over control protrusion 156d of positioning pawl 156 and release cam member 157c of release member 157 because of the inclined rear surfaces of these components.

Figure 22:
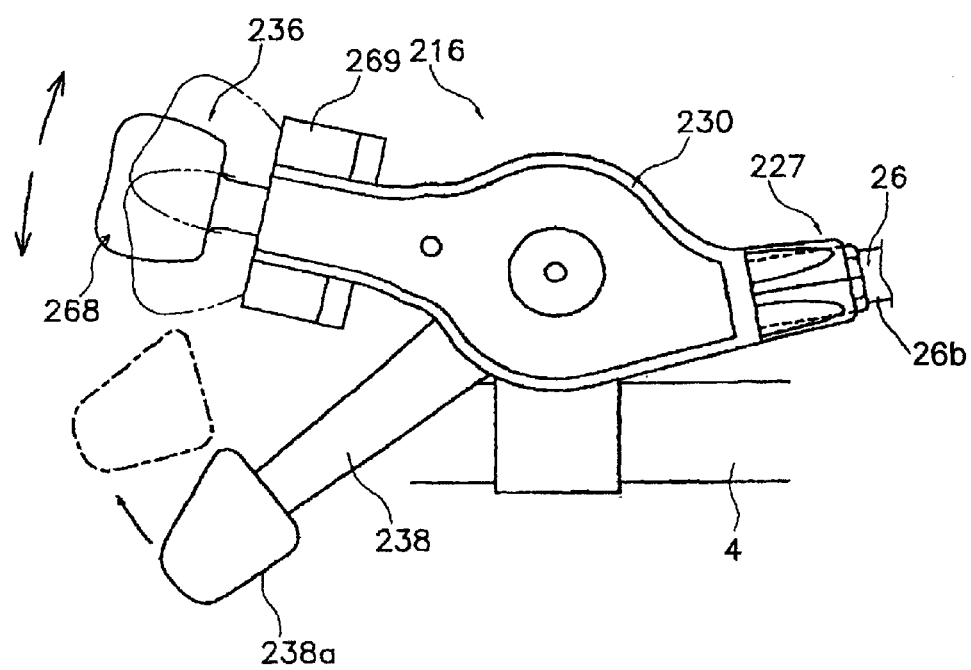
FIG. 22 is a plan view of a third embodiment of a shift control device.
Figure 23:
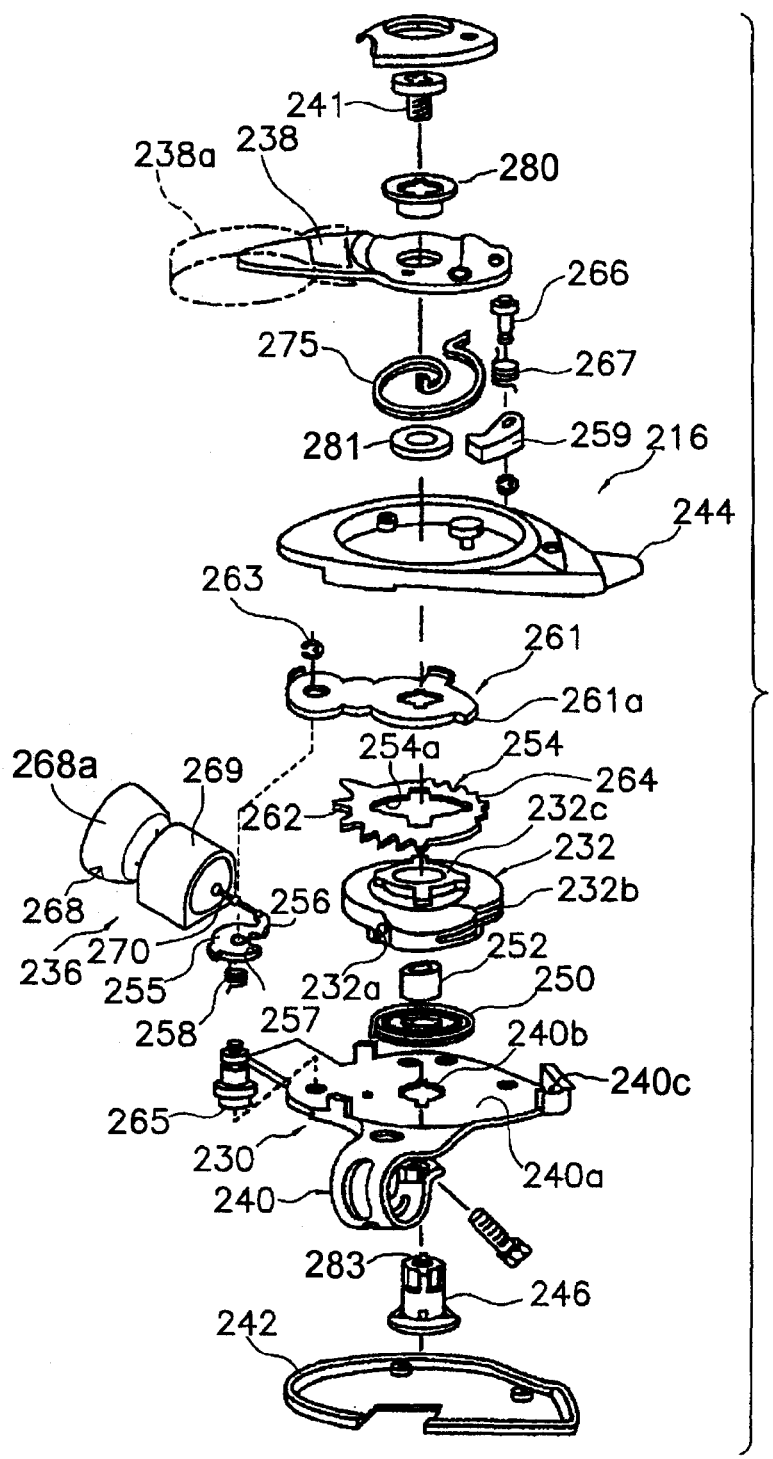
FIG. 23 is an exploded view of the shift control device.
Figure 24:
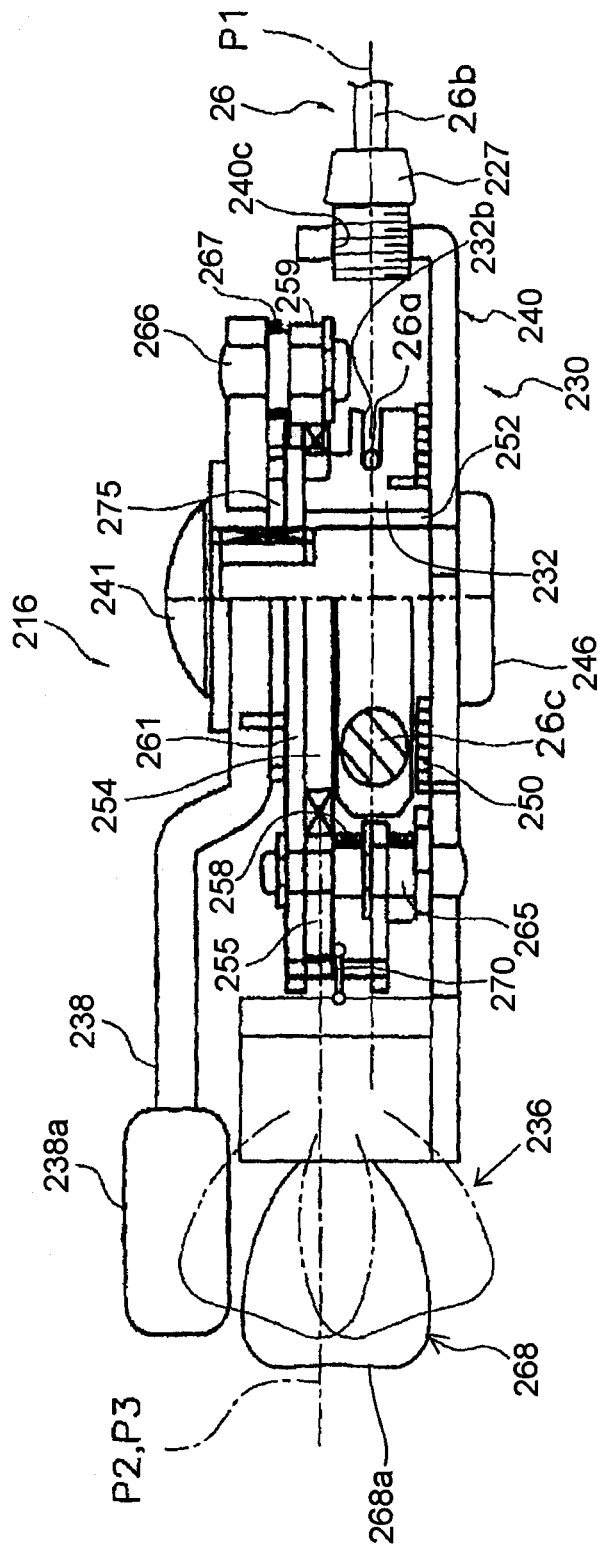
FIG. 24 is a partial cross-sectional view of the shift control device.

FIG. 22 is a plan view of another embodiment of a rear shift control device 216, FIG. 23 is an exploded view of rear shift control device 216, and FIG. 24 is a partial cross-sectional view of shift control device 216. In the second embodiment, release lever 135 rotated in a plane parallel to the first plane (P1), but in this embodiment a joystick-type release lever 236 is used. In this embodiment, rear shift control device 216 comprises a mounting member 230 including a bracket 240 that may be formed from a metal plate configured to mount to handlebar 4 by a fastening bolt, a first cover 242 mounted to the lower side of bracket 240, and a second cover 244 mounted to the upper side of bracket 240. Bracket 240 has a planar surface 240a defining an opening 240b through which a support shaft 246 passes. Bracket 240 also has a threaded opening 240c for threadingly receiving an outer casing terminating member 227 therein for terminating an outer casing 26b (FIG. 22) of a rear shift cable 26.

A winding member 232 is rotatably mounted around support shaft 246 via a bushing 252 between bracket 240 and second cover 244. Winding member 232 rotates in a plane P1 (FIG. 24) parallel to plane 240a of bracket 240 in cable pulling (winding) and releasing (unwinding) directions. Winding member 232 includes, at an outer peripheral surface thereof, a cable coupling member 232a that locks a cable nipple 26c secured to a tip of inner cable 26a, and a cable winding groove 232b for winding inner cable 26a. A biasing member in the form of a torsion spring 250 biases winding member 232 in a cable releasing direction. Spring 250 has one end fixed to winding member 232 and another end fixed to mounting bracket 240. An engaging protrusion 232c is formed on the upper surface of winding member 232 for engaging a mounting opening 254a in a positioning member 254 so that winding member 232 and positioning member 254 rotate as a unit. In this embodiment, positioning member 254 has a plurality of, e.g., seven radially extending positioning teeth 262 and a plurality of, e.g., seven radially extending drive teeth 264 corresponding to the number of shift positions of rear derailleur 18, and they are spaced accordingly.

Figure 25:
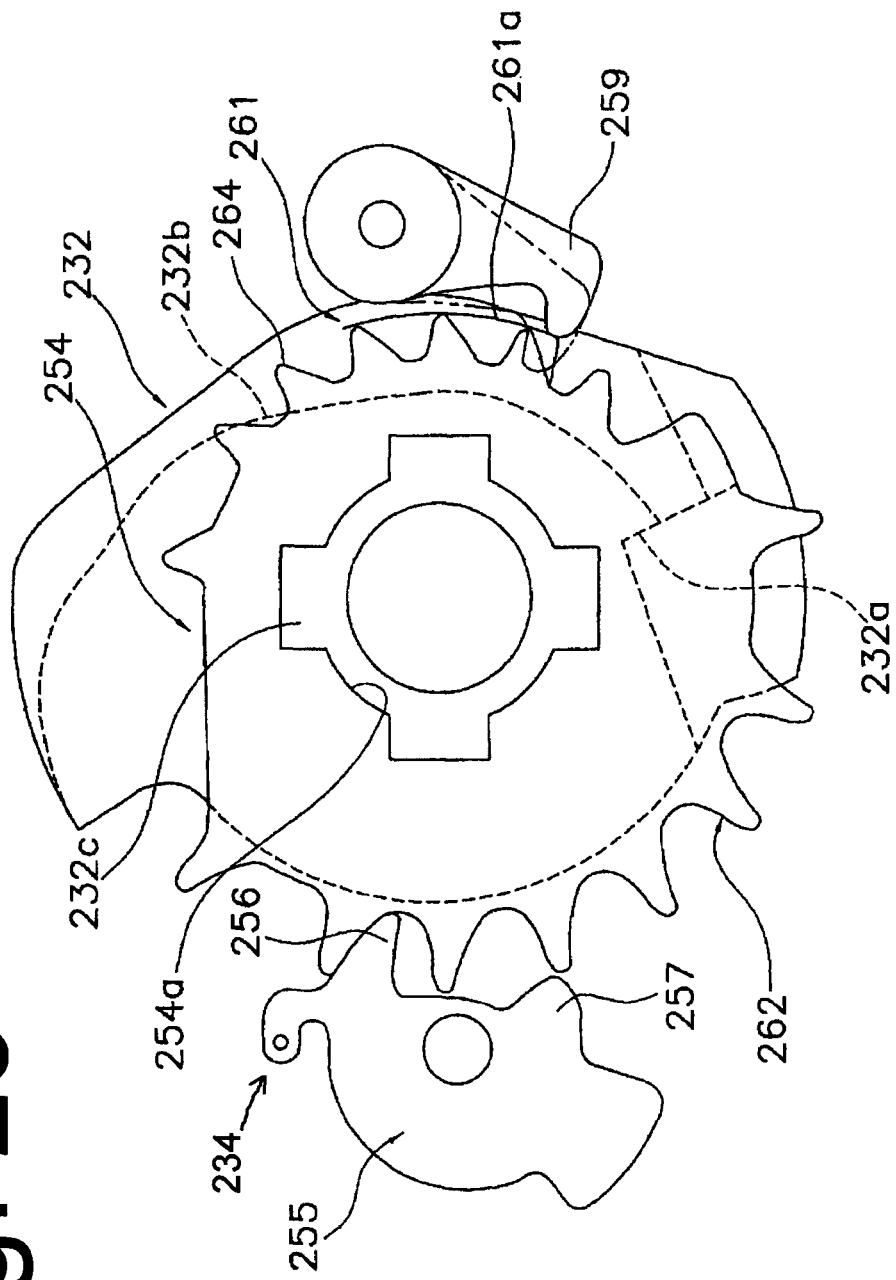
FIG. 25 is a plan view of a positioning unit.

A pawl unit 255 including a positioning pawl 256 and a tooth engaging pawl 257 formed together as one piece is pivotably mounted to a pivot shaft 265. Pivots shaft 265 is attached to bracket 240 and to a pawl control plate 261. Pawl control plate 261 is nonrotatably mounted to support shaft 246, and the top of pivot shaft 265 is secured to pawl control plate 261 by a snap ring 263. Positioning pawl 256 rotates in a plane P2 parallel to the rotation plane P1 of winding member 232 between an engaged position shown in FIG. 26A for engaging one of the plurality of positioning teeth 262 (e.g., positioning tooth 262b), thereby preventing rotation of winding member 232 in the cable releasing direction and setting winding member 232 in one of a plurality of operating positions for rear derailleur 18, and a disengaged position shown in FIG. 26B for disengaging from the plurality of positioning teeth 262, thereby allowing rotation of winding member 232. Similarly, tooth engaging pawl 257 rotates in a plane P3 parallel to the rotation plane P1 of winding member 232 between an engaged position shown in FIG. 26B for engaging one of the plurality of positioning teeth 262 (e.g., positioning tooth 262c), thereby preventing unlimited rotation of winding member 232 in the cable unwinding direction after positioning pawl 256 disengages from positioning teeth 262b, and a disengaged position shown in FIG. 26A for disengaging from the plurality of positioning teeth 262, thereby allowing rotation of winding member 232. A biasing member in the form of a torsion spring 258 biases pawl unit 255 so that positioning pawl 256 is urged toward positioning teeth 262 and tooth engaging pawl 257 is urged away from positioning teeth 262. Positioning member 254 and positioning pawl 256 form a positioning unit 234 (FIG. 25) for maintaining winding member 232 in selected ones of a plurality of operating positions.

As shown in FIGS. 22 and 23, a cable winding lever 238 is mounted to support shaft 246 through a bushing 280 and a washer 281 for rotation between a neutral or start position shown by a solid line in FIG. 22 and finish positions shown by broken lines in FIG. 22. A bolt 241 screws into a threaded opening 283 in the tip of support shaft 246 to hold winding lever 238 in place. A biasing member such as a torsion spring 275 biases winding lever 238 toward the start position. An operating knob 238a is provided at the outer end of winding lever 238.

A drive pawl 259 is rotatably mounted to cable winding lever 238 through a pivot shaft 266 such that drive pawl 259 is located at the opposite end of cable winding lever 238 across from support shaft 246. A biasing member in the form of a torsion spring 267 biases drive pawl 259 toward engagement with the plurality of drive teeth 254, shown by a broken line in FIG. 25. However, pawl control plate 261 has an abutting member 261a to maintain drive pawl 259 in the disengaged position shown by a solid line in FIG. 25 when winding lever 238 is located in the neutral position. When the rider rotates winding lever 238 from the start position toward the finish position, the tip of drive pawl 259 moves off from abutting member 261a and rotates toward the engaged position.

Figure 26A:
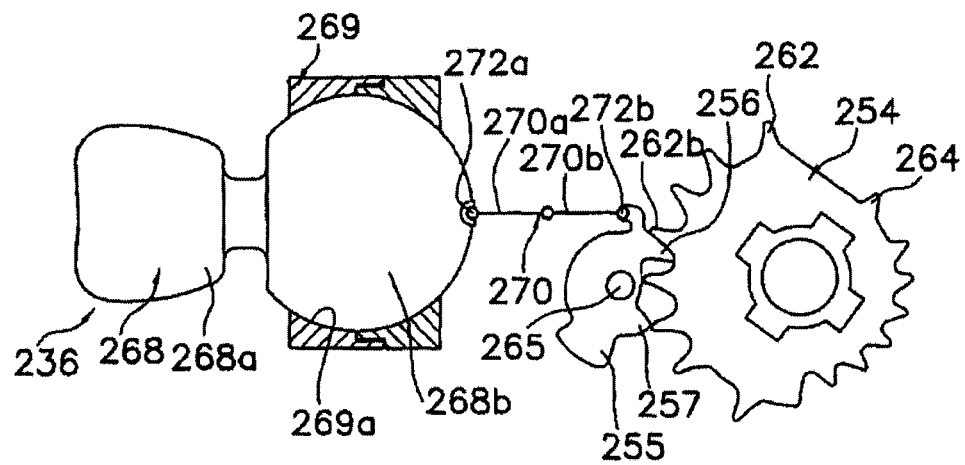
FIGS. 26A-26C are schematic views illustrating a cable releasing operation.

As shown in FIGS. 23 and 26A, release lever 236 has the form of a joystick that includes a lever body 268 comprising an operating knob 268a and a generally spherical pivot member 268b mounted within a socket 269 secured to bracket 240. Pivot member 268b moves along a generally spherical guide surface 269a of socket 269 so that lever body 268 moves in at least two dimensions shown by broken lines in FIG. 22. More specifically, because of the generally spherical pivot member 268b, release lever 236 is capable of movement in a three-dimensional spherical coordinate system that includes a plane and a direction in addition to the plane (e.g., in the directions shown in FIGS. 26A-26C as well as a direction away from the page), or along at least three perpendicular directions (e.g., in the directions shown in FIGS. 26A-26C as well as perpendicular to the page). An intermediate member 270 is pivotably coupled between pivot member 268b and pawl unit 255 so that positioning pawl 256 and tooth engaging pawl 257 may move between their engaged and disengaged positions in a manner described below. Spring 258 biases release lever 236 to the start position as a result of the biasing force applied to release lever 236 through pawl unit 255 and intermediate member 270.

As shown in FIG. 26A, intermediate member 270 includes a first link member 270a and a second link member 270b, wherein first link member 270a is pivotably connected to the outer periphery of pivot member 268b of release lever body 268 through a universal joint 272a, and second link member 270b is pivotably connected to pawl unit 255 through a universal joint 272b. First link member 270a is pivotably connected to second link member 270b by any suitable means, such as by another universal joint. If desired, first and second link members 270a and 270b may be replaced with a tensionable and/or releasable member such as a wire or a rope.

Figure 26B:
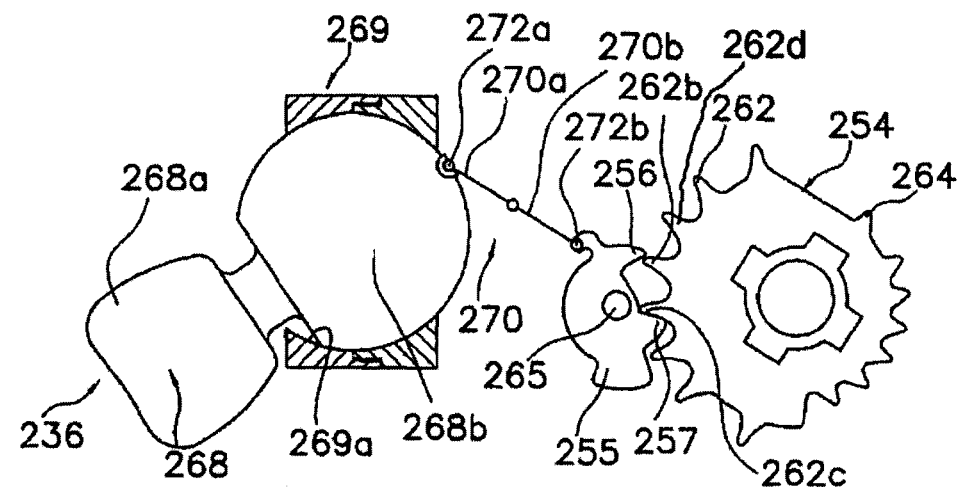
Figure 26C:
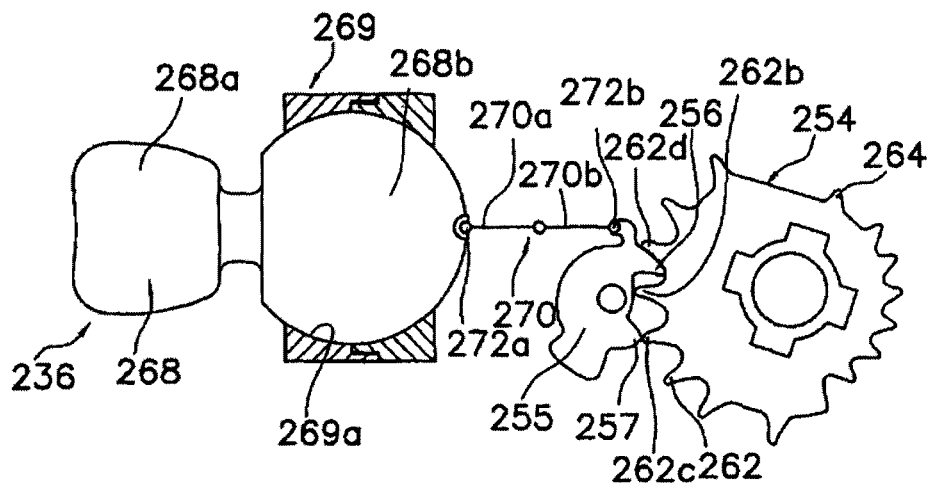

FIGS. 26A-26C are schematic views illustrating a cable releasing operation. When the rider moves operating knob 268a of release lever 236 from the start position shown in FIG. 26A to the finish position shown in FIG. 26B, pivot member 268b rotates around the center of guide surface 269a, pivot member 268b pulls intermediate member 270, and pawl unit 255 rotates counterclockwise to move positioning pawl 256 from the engaged position to the disengaged position and to move tooth engaging pawl 257 from the disengaged position to the engaged position. As a result, positioning pawl 256 disengages from positioning tooth 262b, and winding member 232 and positioning member 254 rotate in the cable releasing direction until tooth engaging pawl 257 engages positioning tooth 262c as shown in FIG. 26B.

When the rider releases release lever 236, spring 258 rotates pawl unit 255 clockwise so that positioning pawl 256 moves from the disengaged position to the engaged position and tooth engaging pawl 257 moves from the engaged position to the disengaged position. As a result, tooth engaging pawl 257 disengages from positioning tooth 262c, and winding member 232 and positioning member 254 rotate in the cable releasing direction until positioning pawl 256 engages positioning tooth 262d as shown in FIG. 26C, thereby setting winding member 232 in a destination operating position. At the same time, pawl unit 255 pulls intermediate member 270 to move release lever 236 back to the start position.

Figure 27A:
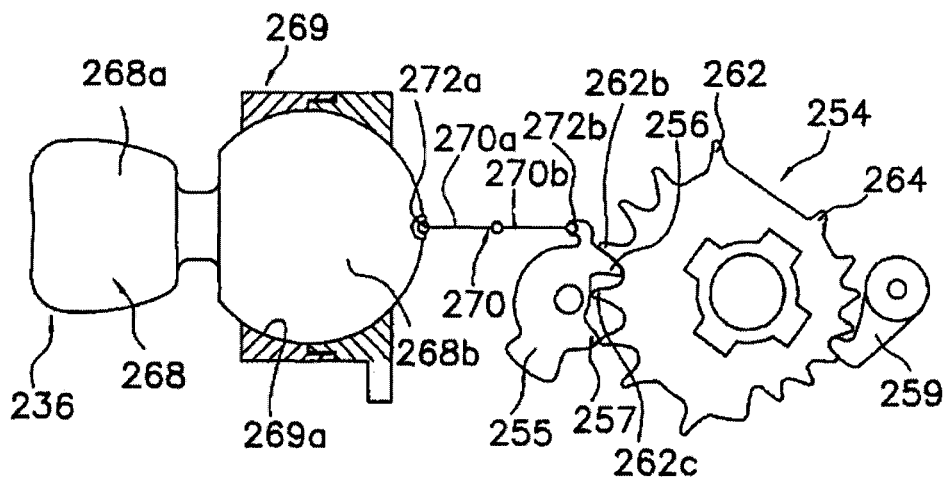
FIGS. 27A-27C are schematic views illustrating a cable winding operation.
Figure 27B:
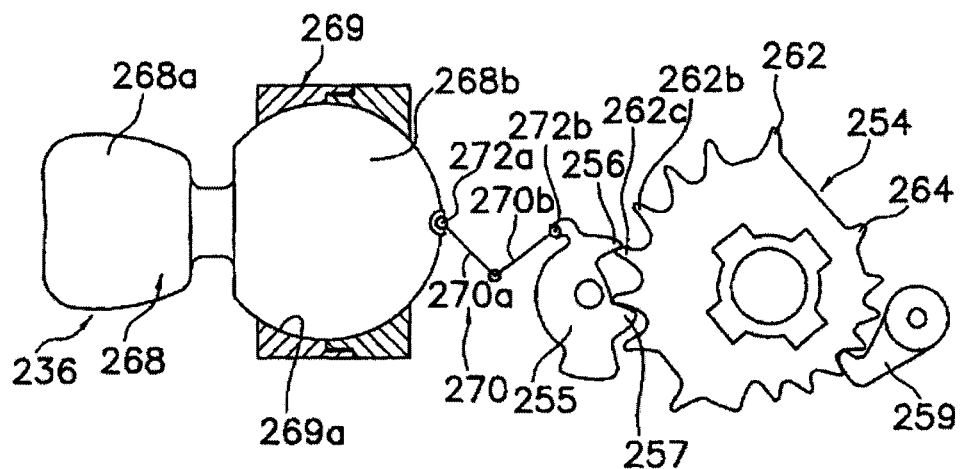
Figure 27C:
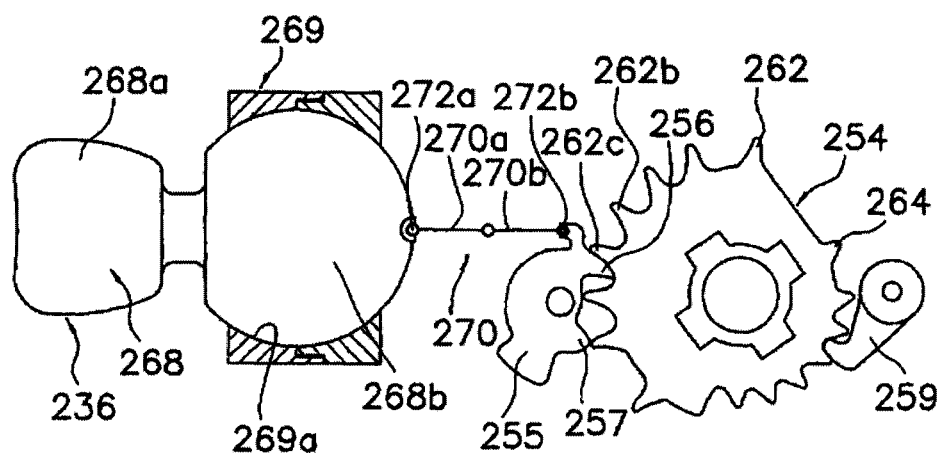

FIGS. 27A-27C are schematic views illustrating a cable winding operation. When the rider moves winding lever 238 from the start position toward the finish position, the tip of drive pawl 259 moves away from abutting member 261a of pawl control plate 261, and drive pawl 259 is biased by spring 267 to engage drive teeth 264 as shown in FIG. 27A. Continued movement of winding lever 238 causes winding member 232 and positioning member 254 to rotate in the cable pulling direction (clockwise in FIG. 27A). During this time, positioning tooth 262c presses against positioning pawl 256 as shown in FIG. 27B so that pawl unit 255 rotates counterclockwise to the disengaged position. First and second link members 270a and 270b of intermediate member 270 bend at their connecting members so that release lever 236 need not move. After positioning tooth 262c passes under positioning pawl 256, pawl unit 255 rotates clockwise so that positioning pawl 256 moves back to the engaged position. If the rider releases winding lever 238 at this time, then winding member 232 and positioning member 254 rotate counterclockwise until positioning pawl 256 engages positioning tooth 262c, and winding member 232 is set at the destination operating position as shown in FIG. 27C. If the rider continues moving release lever 238, then the process repeats so that winding member 232 moves through a plurality of destination positions.

Figure 28A:
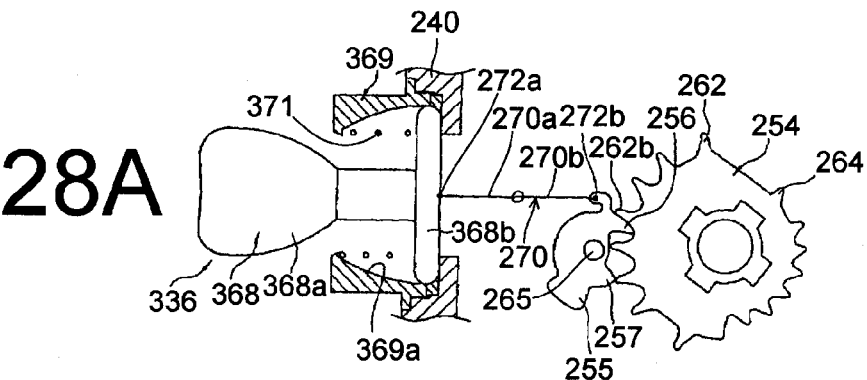
FIGS. 28A-28C are schematic views illustrating a cable releasing operation of a fourth embodiment of a shift control device.
Figure 28B:
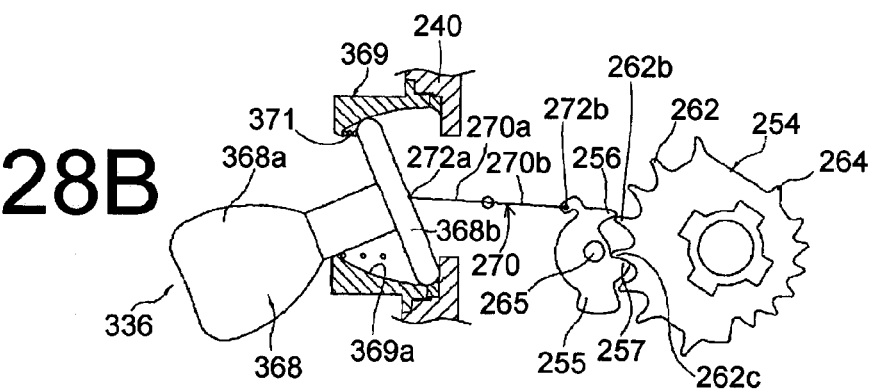
Figure 28C:
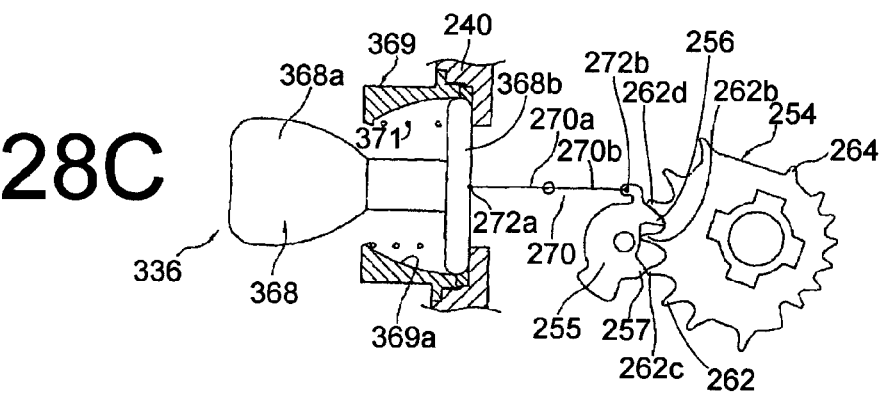

FIGS. 28A-28C are schematic views illustrating a cable releasing operation of a fourth embodiment of a shift control device that includes another embodiment of a release lever 336. This embodiment is constructed substantially the same as shift control device 216, so the same components have the same reference numbers as in that embodiment. In this embodiment, release lever 336 also has the form of a joystick that includes a lever body 368 comprising an operating knob 368a and a generally disk-shaped pivot member 368b mounted within a socket 369 secured to bracket 240. Pivot member 368b moves along a curved guide surface 369a of socket 369 so that lever body 368 moves in multiple dimensions similar to the movement of release lever 236 in the previous embodiment (i.e., release lever 336 is capable of movement in a three-dimensional coordinate system). As in that embodiment, intermediate member 270 is pivotably coupled between pivot member 368b and pawl unit 255 so that positioning pawl 256 and tooth engaging pawl 257 may move between their engaged and disengaged positions in the same manner described previously. Spring 258 (FIG. 23) biases release lever 336 to a start position in the same manner as release lever 236 and shown by a solid line in FIG. 22 as a result of the biasing force applied to release lever 336 through pawl unit 255 and intermediate member 270.

Figure 29A:
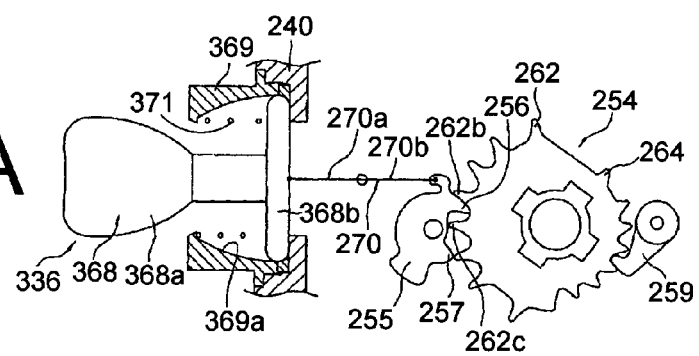
FIGS. 29A-29C are schematic views illustrating a cable winding operation.
Figure 29B:
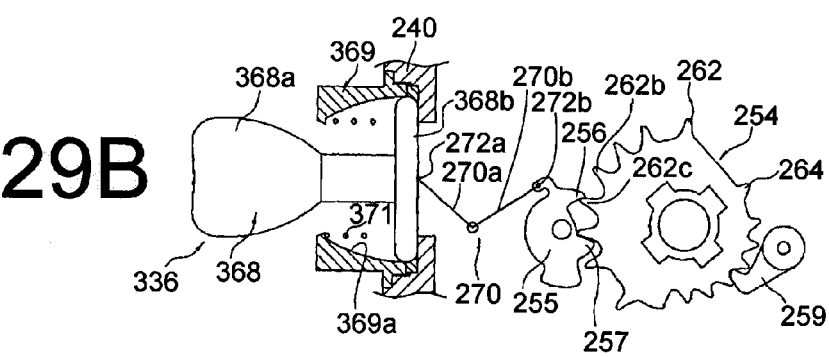
Figure 29C:
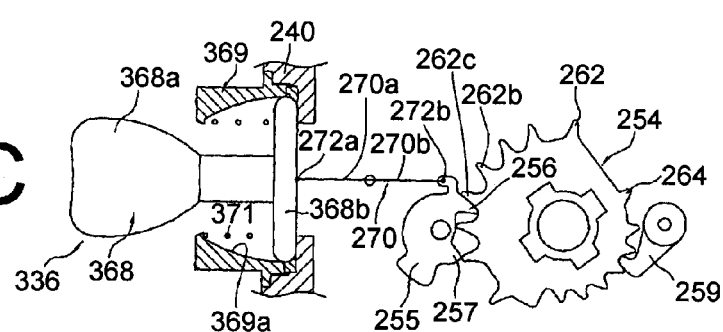

FIGS. 29A-29C are schematic views illustrating a cable winding operation of this embodiment of a shift control device. The operation is the same as in the previous embodiment and will not be described in detail.

Figure 30:
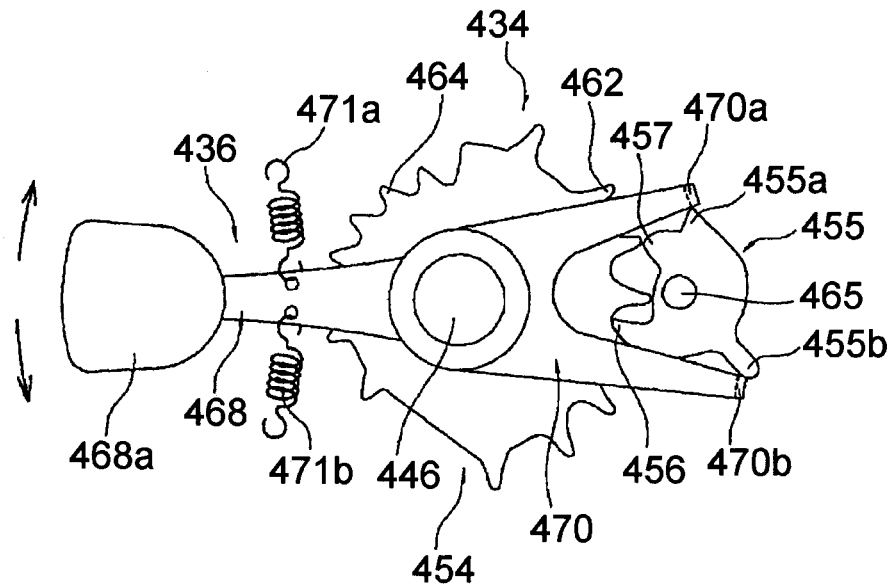
FIG. 30 is a schematic plan view of a fifth embodiment of a shift control device.

FIG. 30 is a schematic plan view of a fifth embodiment of a shift control device that may be a modification of the embodiment shown in FIGS. 22-27C. In this embodiment, a release lever 436 is rotatably supported by a support shaft 446, which may be a modified version of support shaft 246 in FIG. 23, and it rotates in a first direction (e.g., clockwise) and a second direction (e.g., counterclockwise) from a neutral position. Release lever 436 is biased to the neutral position by two biasing members in the form of coil springs 471a and 471b. Release lever 436 includes a lever body 468 and an intermediate member 470 configured such that support shaft 246 is disposed between lever body 468 and intermediate member 470. An operating knob 468a is fitted to the free end of lever body 468.

Intermediate member 470 has two operation members 470a and 470b shaped as forked tips with a space therebetween. The free ends of operation members 470a and 470b bend in the axial direction of support shaft 446 toward a pawl unit 455 that is rotatably supported by a pivot shaft 465. Pawl unit 455 includes a positioning pawl 456, a tooth engaging pawl 457, and engagement structures in the form of first and second engaging members 455a and 455b that engage operation members 470a and 470b, respectively. As in the previous embodiments, a positioning member 454 has a plurality of, e.g., eight radially extending positioning teeth 462 and eight radially extending drive teeth 464 corresponding to the number of shift positions of rear derailleur 18, and they are spaced accordingly. Positioning member 454 is rotatably supported around support shaft 446, and pawl unit 455 is biased so that positioning pawl 456 is urged toward the plurality of positioning teeth 462. Positioning member 454 and positioning pawl 456 form a positioning unit 434 for maintaining the winding member in selected ones of a plurality of operating positions.

When the rider rotates lever member 436 clockwise through operating knob 468a, operation member 470a contacts the right side surface of engaging member 455a, thereby causing pawl unit 455 to rotate counterclockwise, and positioning unit 434 operates as in the previous embodiments. When the rider releases lever member 436, lever member 468 rotates counterclockwise back to the neutral position in accordance with the biasing force of spring 471a, and pawl unit 455 rotates clockwise so that positioning unit 434 again operates as in the previous embodiments. When the rider rotates lever member 436 counterclockwise through operating knob 468a, operation member 470b contacts the left side surface of engaging member 455b, thereby again causing pawl unit 455 to rotate counterclockwise, and positioning unit 434 operates as in the previous embodiments. When the rider releases lever member 436, lever member 436 rotates clockwise back to the neutral position in accordance with the biasing force of spring 471b, and pawl unit 455 rotates clockwise so that positioning unit 434 again operates as in the previous embodiments.

Figure 31:
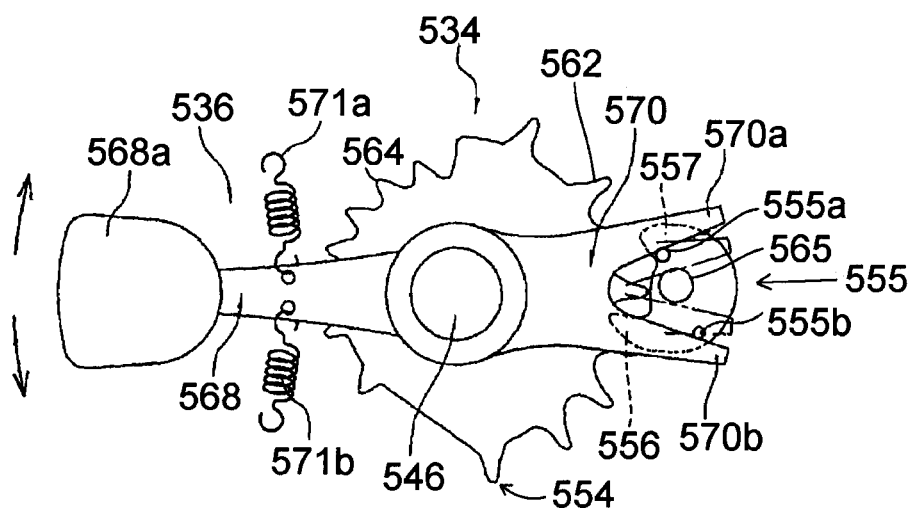
FIG. 31 is a schematic plan view of a sixth embodiment of a shift control device.

FIG. 31 is a schematic plan view of a sixth embodiment of a shift control device that also may be a modification of the embodiment shown in FIGS. 22-27C. In this embodiment, a release lever 536 is rotatably supported by a support shaft 546, which also may be a modified version of support shaft 246 in FIG. 23, and it rotates in a first direction (e.g., clockwise) and a second direction (e.g., counterclockwise) from a neutral position. Release lever 536 is biased to the neutral position by two biasing members in the form of coil springs 571a and 571b. Release lever 536 includes a lever body 568 and an intermediate member 570 configured such that support shaft 546 is disposed between lever body 568 and intermediate member 570. An operating knob 568a is fitted to the free end of lever body 568.

Intermediate member 570 has two operation members 570a and 570b shaped as forked members with free ends having a space therebetween. The operation members 570a and 570b extend toward a pawl unit 555 that is rotatably supported by a pivot shaft 565. Pawl unit 555 includes a positioning pawl 556, a tooth engaging pawl 557, and engagement structures in the form of first and second engaging pins 555a and 555b that engage operation members 570a and 570b, respectively. As in the previous embodiments, a positioning member 554 has a plurality of, e.g., eight radially extending positioning teeth 562 and eight radially extending drive teeth 564 corresponding to the number of shift positions of rear derailleur 18, and they are spaced accordingly. Positioning member 554 is rotatably supported around support shaft 546, and pawl unit 555 is biased so that positioning pawl 556 is urged toward the plurality of positioning teeth 562. Positioning member 554 and positioning pawl 556 form a positioning unit 534 for maintaining the winding member in selected ones of a plurality of operating positions.

When the rider rotates lever member 536 clockwise through operating knob 568a, operation member 570a contacts engaging pin 555a. Operation member 570a is shaped, or engaging pin 555a is located on pawl unit 555, so that pawl unit 555 rotates counterclockwise, and positioning unit 534 operates as in the previous embodiments. When the rider releases lever member 536, lever member 536 rotates counterclockwise back to the neutral position in accordance with the biasing force of spring 571a, and pawl unit 555 rotates clockwise so that positioning unit 534 again operates as in the previous embodiments. When the rider rotates lever member 536 counterclockwise through operating knob 568a, operation member 570b contacts engaging member 555b. Operation member 570b is shaped, or engaging pin 555b is located on pawl unit 555, so that pawl unit 555 again rotates counterclockwise, and positioning unit 534 operates as in the previous embodiments. When the rider releases lever member 536, lever member 536 rotates clockwise back to the neutral position in accordance with the biasing force of spring 571b, and pawl unit 555 rotates clockwise so that positioning unit 534 again operates as in the previous embodiments.

Figure 32:
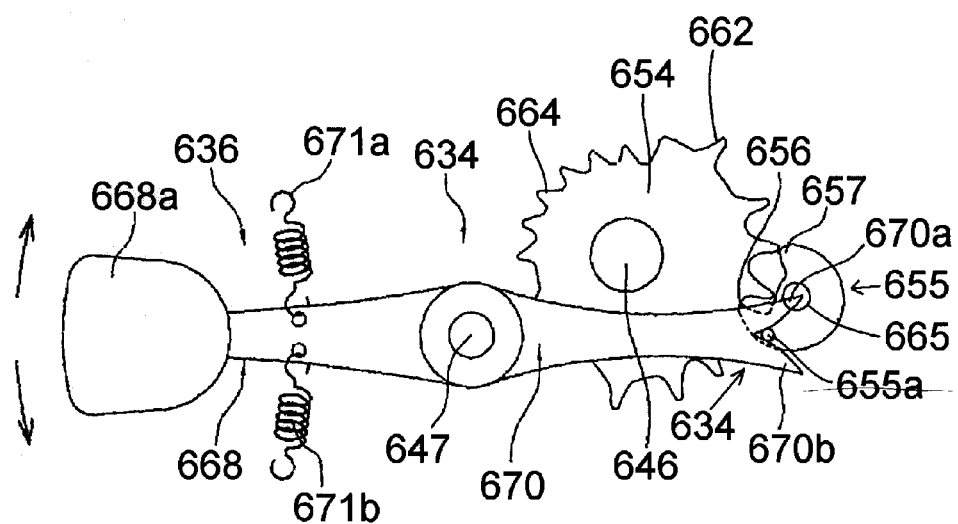
FIG. 32 is a schematic plan view of a seventh embodiment of a shift control device

FIG. 32 is a schematic plan view of a seventh embodiment of a shift control device that also may be a modification of the embodiment shown in FIGS. 22-27C. In this embodiment, a release lever 636 is rotatably supported by a pivot shaft 647, and it rotates in a first direction (e.g., clockwise) and a second direction (e.g., counterclockwise) from a neutral position. Release lever 636 is biased to the neutral position by two biasing members in the form of coil springs 671a and 671b. Release lever 636 includes a lever body 668 and an intermediate member 670 configured such that pivot shaft 647 is disposed between lever body 668 and intermediate member 670. An operating knob 668a is fitted to the free end of lever body 668.

Intermediate member 670 has two operation members 670a and 670b shaped as forked members formed by two facing convex surfaces with free ends having a space therebetween. The operation members 670a and 670b extend toward a pawl unit 655 that is rotatably supported by a pivot shaft 665. Pawl unit 655 includes a positioning pawl 656, a tooth engaging pawl 657, and an engagement structure in the form of an engaging pin 655a that is located at the junction of operation members 670a and 670b. As in the previous embodiments, a positioning member 654 has a plurality of, e.g., eight radially extending positioning teeth 662 and eight radially extending drive teeth 664 corresponding to the number of shift positions of rear derailleur 18, and they are spaced accordingly. Positioning member 654 is rotatably supported around a support shaft 646 that is offset from pivot shaft 647, and pawl unit 655 is biased so that positioning pawl 656 is urged toward the plurality of positioning teeth 662. Positioning member 654 and positioning pawl 656 form a positioning unit 634 for maintaining the winding member in selected ones of a plurality of operating positions.

When the rider rotates lever member 636 clockwise through operating knob 668a, operation member 670a contacts engaging pin 655a. The convex surface of operation member 670a presses against engaging pin 655a so that pawl unit 655 rotates counterclockwise, and positioning unit 634 operates as in the previous embodiments. When the rider releases lever member 636, lever member 636 rotates counterclockwise back to the neutral position in accordance with the biasing force of spring 671a, and pawl unit 655 rotates clockwise so that positioning unit 634 again operates as in the previous embodiments. When the rider rotates lever member 636 counterclockwise through operating knob 668a, the convex surface of operation member 670b contacts engaging member 655a so that pawl unit 655 again rotates counterclockwise, and positioning unit 634 operates as in the previous embodiments. When the rider releases lever member 636, lever member 636 rotates clockwise back to the neutral position in accordance with the biasing force of spring 671b, and pawl unit 655 rotates clockwise so that positioning unit 534 again operates as in the previous embodiments.

While the above is a description of various embodiments of inventive features, further modifications may be employed without departing from the spirit and scope of the present invention. For example, while the disclosed embodiments were used to shift derailleur transmissions, the concepts also could be applied to other control devices, such as internal hub transmissions. While the mounting members of the shift control devices were separated from the brake levers, the mounting members could be formed integrally with the brake lever assemblies. While the embodiments shown in FIGS. 22-32 included a positioning unit that operated to shift gears by one step at a time, the positioning unit easily can be modified to shift multiple gears for each operation of the releaser lever.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A shift operating device for a bicycle transmission comprising:
    a mounting member structured to be mounted to the bicycle;
    a cable coupling member coupled to the mounting member for moving a cable in a cable pulling direction and a cable releasing direction;
    a positioning unit that selectively maintains the cable coupling member in a plurality of operating positions, wherein each operating position corresponds to a shift position of the bicycle transmission, wherein the positioning unit includes a positioning member that moves in a gear shift initiating direction to initiate a gear shift, wherein the gear shift is movement of the cable coupling member from an origin operating position that corresponds to an origin shift position of the bicycle transmission to a destination operating position that corresponds to a destination shift position of the bicycle transmission;
    a first operating member operatively coupled to the mounting member so that the first operating member moves in a first direction and in a second direction different from the first direction;
    wherein the first operating member includes an operating location that moves in the same direction when the first operating member moves in either the first and second directions; and
    an intermediate member operatively coupled to the operating location of the first operating member and operatively coupled to the positioning member so that the positioning member moves in the gear shift initiating direction when the first operating member moves in the first direction and so that the positioning member moves in the gear shift initiating direction when the first operating member moves in the second direction;
    wherein the first operating member causes the initiation of the gear shift when the first operating member moves in the first direction, and wherein the first operating member causes the initiation of the gear shift when the first operating member moves in the second direction;
    wherein the cable coupling member moves from the origin operating position toward the destination operating position in a predetermined direction to initiate the gear shift when the first operating member moves in the first direction, and wherein the cable coupling member moves from the origin operating position toward the destination operating position in the same direction as the predetermined direction to initiate the gear shift when the first operating member moves in the second direction;
    wherein the first operating member has a neutral position;
    wherein the first operating member moves in the first direction from the neutral position toward a first operating member gear shift initiating position;
    wherein the first operating member moves in the second direction from the neutral position toward a different second operating member gear shift initiating position; and
    wherein the neutral position is disposed between the first operating member gear shift initiating position and the second operating member gear shift initiating position;
    wherein the first operating member automatically returns to the neutral position when a user releases the first operating member after moving the first operating member in the first direction or the second direction; and
    wherein the first operating member remains in the neutral position after the user releases the first operating member.

2. The device according to claim 1 wherein the cable coupling member moves to a plurality of destination operating positions in response to a single movement of the first operating member in one of the first direction or the second direction from a first operating member start position to a first operating member finish position.

3. The device according to claim 1 wherein the positioning unit further comprises:
    a plurality of abutments that move integrally with the cable coupling member; and wherein the positioning member selectively engages the plurality of abutments to maintain the cable coupling member in the plurality of operating positions.

4. The device according to claim 3 wherein movement of the intermediate member causes the positioning member to disengage from an engaged one of the plurality of abutments so that the cable coupling member moves away from an origin operating position.

5. The device according to claim 4 further comprising a release element that communicates movement of the intermediate member to the positioning member.

6. The device according to claim 5 wherein the release element moves in a prescribed direction when the first operating member moves in the first direction, and wherein the release element moves in the same prescribed direction when the first operating member moves in the second direction.

7. The device according to claim 5 wherein the intermediate member moves in a prescribed direction when the first operating member moves in the first direction, and wherein the intermediate member moves in the same prescribed direction when the first operating member moves in the second direction.

8. The device according to claim 5 wherein movement of the cable coupling member causes the release element to move so that the positioning member reengages one of the plurality of abutments to maintain the cable coupling member in the destination operating position.

9. The device according to claim 4 further comprising:
a first pivot shaft; and
a second pivot shaft spaced apart from the first pivot shaft;
wherein the first operating member pivots around the first pivot shaft when the first operating member moves in the first direction from the neutral position; and
wherein the first operating member pivots around the second pivot shaft when the first operating member moves in the second direction from the neutral position.

10. The device according to claim 9 wherein the first operating member includes a first guide that engages the first pivot shaft and a second guide that engages the second pivot shaft, and further comprising a biasing member that biases the first operating member so that the first pivot shaft engages an end of the first guide and the second pivot shaft engages an end of the second guide.

11. The device according to claim 10 wherein the first guide has an arcuate shape.

12. The device according to claim 11 wherein the second guide has an arcuate shape.

13. The device according to claim 9 further comprising a support shaft spaced apart from the first pivot shaft and the second pivot shaft, wherein the cable coupling member rotates around the support shaft.

14. The device according to claim 4 wherein movement of the cable coupling member causes the positioning member to move so that the positioning member reengages one of the plurality of abutments to maintain the cable coupling member in the destination operating position.

15. The device according to claim 14 wherein the plurality of abutments comprise a plurality of teeth that move integrally with the cable coupling member, and wherein the positioning member comprises a pawl.

16. The device according to claim 15 wherein the pawl comprises:
a positioning pawl that engages one of the plurality of teeth to maintain the cable coupling member in one of the plurality of operating positions; and
a tooth engaging pawl that engages one of the plurality of teeth when the positioning pawl disengages from a previously engaged tooth.

17. The device according to claim 16 wherein movement of the cable coupling member causes one of the plurality of teeth to engage the tooth engaging pawl to cause the positioning pawl to engage another one of the plurality of teeth to maintain the cable coupling member in a destination operating position.

18. The device according to claim 17 wherein the positioning pawl rotates integrally with the tooth engaging pawl so that movement of the intermediate member causes the positioning pawl to rotate to disengage from one of the plurality of teeth, and movement of the cable coupling member causes one of the plurality of teeth to contact the tooth engaging pawl and rotate the tooth engaging pawl so that the positioning pawl engages another one of the plurality of teeth to maintain the cable coupling member in a destination operating position.

19. The device according to claim 4 wherein the first operating member has a three-dimensional freedom of movement.

20. The device according to claim 4 wherein the first operating member moves at least in part in a spherical coordinate system.

21. The device according to claim 4 wherein the first operating member moves in a plane and in a direction in addition to movement in the plane.

22. The device according to claim 21 wherein the first operating member moves in at least three perpendicular directions.

23. The device according to claim 21 wherein the intermediate member is pivotably coupled to the first operating member.

24. The device according to claim 21 wherein the intermediate member is coupled to the first operating member through a universal joint.

25. The device according to claim 21 wherein the intermediate member is pivotably coupled to the positioning member.

26. The device according to claim 25 wherein the intermediate member is coupled to the positioning member through a universal joint.

27. The device according to claim 21 wherein the positioning member comprises a pawl.

28. The device according to claim 27 wherein the pawl comprises:
a positioning pawl that engages one of the plurality of teeth to maintain the cable coupling member in one of the plurality of operating positions; and
a tooth engaging pawl that engages one of the plurality of teeth when the positioning pawl disengages from a previously engaged tooth.

29. The device according to claim 21 wherein the first operating member includes a generally spherical pivot member mounted within a socket.

30. The device according to claim 21 wherein the first operating member includes a disk-shaped member mounted within a socket.

31. A shift operating device for a bicycle comprising:
a mounting member structured to be mounted to the bicycle;
a cable coupling member coupled to the mounting member for moving a cable in a cable pulling direction and a cable releasing direction;

a positioning unit that selectively maintains the cable coupling member in a plurality of operating positions, wherein the positioning unit comprises:
    a plurality of positioning teeth that move integrally with the cable coupling member; and
    a positioning pawl that moves between a tooth engaged position, for engaging selective ones of the plurality of teeth, and a tooth disengaged position;
    a separate tooth engaging pawl operatively coupled to the plurality of positioning teeth, wherein the tooth engaging pawl moves relative to the positioning pawl, and wherein the tooth engaging pawl moves between a tooth engaged position, for engaging selective ones of the plurality of teeth, and a tooth disengaged position; and
a release element that moves at least in part linearly and has a plurality of release members that engage the positioning pawl to progressively cause the positioning pawl to move from the tooth engaged position to the tooth disengaged position multiple times for a single movement of the release element;
wherein the tooth engaging pawl engages at least one of the plurality of teeth when the plurality of teeth move as a result of the positioning pawl moving to the tooth disengaged position; and
wherein the tooth engaging pawl disengages at least one of the plurality of release members from the positioning pawl when the plurality of positioning teeth move as a result of the positioning pawl moving to the tooth disengaged position.

32. The device according to claim 31 wherein the plurality of release members are disposed linearly along the release element.

33. The device according to claim 32 wherein the plurality of release members are disposed in a substantially straight line.

34. The device according to claim 31 wherein at least one of the plurality of release members engages the positioning pawl to cause the positioning pawl to move from the tooth engaged position to the tooth disengaged position, and wherein movement of the plurality of teeth causes the tooth engaging pawl to disengage the at least one of the plurality of release members from the positioning pawl.

35. The device according to claim 34 wherein engagement between the tooth engaging pawl and the at least one of the plurality of teeth causes the tooth engaging pawl to disengage the at least one of the plurality of release members from the positioning pawl.

36. The device according to claim 1 wherein the intermediate member is operatively coupled to the operating location on the first operating member so that the intermediate member moves together with the operating location.

37. The device according to claim 36 wherein the intermediate member is operatively coupled to the operating location on the first operating member so that the intermediate member follows the movement of the operating location in the same direction when the first operating member moves in both the first and second directions.

38. The device according to claim 37 wherein the intermediate member is coupled between the positioning member and the operating location on the first operating member so that the intermediate member converts movement of the first operating member in the first and second directions into movement of the positioning member in the gear shift initiating direction.

39. The device according to claim 38 wherein the positioning unit further includes a plurality of abutments that move integrally with the cable coupling member, wherein the positioning member comprises a positioning pawl that selectively engages the plurality of abutments to maintain the cable coupling member in the plurality of operating positions, and wherein the intermediate member converts movement of the first operating member in the first and second directions into movement of the positioning pawl in a direction to disengage from an engaged one of the plurality of abutments so that the cable coupling member moves away from an origin operating position.

40. The device according to claim 39 wherein the first operating member pivots around a first axis when the first operating member moves in the first direction from the neutral position, and wherein the first operating member pivots around a separate second axis when the first operating member moves in the second direction from the neutral position.

41. The device according to claim 40 wherein the first axis extends through a first slot in the first operating member, and wherein the second axis extends through a second slot in the first operating member.

* * * * *